United States Patent
Van Hoey et al.

(10) Patent No.: US 11,336,835 B2
(45) Date of Patent: May 17, 2022

(54) METHOD AND SYSTEM FOR ESTIMATING EXPOSURE TIME OF A MULTISPECTRAL LIGHT SOURCE

(71) Applicant: BARCO N.V., Kortrijk (BE)

(72) Inventors: Gert Van Hoey, Sint-Amandsberg (BE); Bart Diricx, Zedelgem (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 17/282,391

(22) PCT Filed: Oct. 4, 2019

(86) PCT No.: PCT/EP2019/076983
§ 371 (c)(1),
(2) Date: Apr. 2, 2021

(87) PCT Pub. No.: WO2020/070322
PCT Pub. Date: Apr. 9, 2020

(65) Prior Publication Data
US 2021/0344827 A1 Nov. 4, 2021

(30) Foreign Application Priority Data
Oct. 4, 2018 (EP) ..................................... 18198732

(51) Int. Cl.
*H04N 5/235* (2006.01)
*H04N 5/225* (2006.01)

(52) U.S. Cl.
CPC ......... *H04N 5/2353* (2013.01); *H04N 5/2256* (2013.01)

(58) Field of Classification Search
CPC ............................ H04N 5/2353; H04N 5/2256
See application file for complete search history.

(56) References Cited

U.S. PATENT DOCUMENTS

| | | |
|---|---|---|
| 6,151,073 A | 11/2000 | Steinberg et al. |
| 2002/0048177 A1 | 4/2002 | Rahm et al. |
| 2002/0191102 A1 | 12/2002 | Yuyama et al. |
| 2003/0098922 A1* | 5/2003 | Barkan ................ H04N 5/2351 348/362 |
| 2004/0135923 A1 | 7/2004 | Kato |
| 2005/0134723 A1 | 6/2005 | Lee et al. |

(Continued)

OTHER PUBLICATIONS

ISR and Written Opinion in corresponding PCT Application No. PCT/EP2019/076983 dated Jan. 8, 2020.

(Continued)

*Primary Examiner* — Chiawei Chen
(74) *Attorney, Agent, or Firm* — Hamre, Schumann, Mueller & Larson, P.C.

(57) ABSTRACT

Methods and/or systems and/or controllers for estimating an exposure time for an imaging device, especially for estimating exposure times that provide maximum saturation levels while keeping the image sensor operating within its linear range. The imaging device includes an external or embedded image sensor and an external or embedded light source. Such a device may be a dermatoscope, a laparoscope, an endoscope, a microscope, or any digital media devices such as mobile phones, tablets, laptops etc. The methods and/or systems and/or controllers can include an LED or OLED light source or any type of solid-state light source.

20 Claims, 11 Drawing Sheets

(56) References Cited

U.S. PATENT DOCUMENTS

| | | | |
|---|---|---|---|
| 2006/0067670 A1* | 3/2006 | Misawa | H04N 5/2351 396/226 |
| 2007/0262236 A1 | 11/2007 | Pertsel | |
| 2009/0185358 A1 | 7/2009 | Liu et al. | |
| 2013/0293702 A1 | 11/2013 | Xin et al. | |
| 2015/0253198 A1* | 9/2015 | Bergen | H04N 5/35581 250/206.1 |
| 2016/0105656 A1* | 4/2016 | Lin | H04N 5/2355 348/223.1 |
| 2018/0098001 A1* | 4/2018 | Park | H04N 5/2621 |

OTHER PUBLICATIONS

EP Search Report in corresponding EP Application No. 18198732.2, dated Mar. 14, 2019.
International Preliminary Report on Patentability in correcponding PCT Application No. PCT/EP2019/076983 dated Apr. 15, 2021.

* cited by examiner

| Exposure metering phase | Light type used during exposure estimation phase | Light type acquisition phase | Number of still images | Remarks |
|---|---|---|---|---|
| White polarized$_1$ | White polarized$_1$ | White polarized$_2$ | 2 | Algorithm according to 'Approach 1 - Per light type metering' |
| White unpolarized$_1$ | White unpolarized$_1$ | White unpolarized$_2$ | 2 | |
| Blue unpolarized$_1$ | Blue unpolarized$_1$ | Blue unpolarized$_2$ | 2 | |
| No additional multispectral images need to be acquired | White polarized$_2$ (this is not a new capture, but extracting information from the earlier acquired White polarized2 capture) | Color 2 polarized$_3$ | 1 | Algorithm according to this approach |
| | | Blue polarized$_3$ | 1 | |
| | | Color 3 polarized$_3$ | 1 | |
| | | Color 4 polarized$_3$ | 1 | |
| | | Color 5 polarized$_3$ | 1 | |
| | | Color 6 polarized$_3$ | 1 | |
| | | Color 7 polarized$_3$ | 1 | |
| | | Color 8 polarized$_3$ | 1 | |

FIG 7

METHOD AND SYSTEM FOR ESTIMATING EXPOSURE TIME OF A MULTISPECTRAL LIGHT SOURCE

The present invention relates to methods and/or systems and/or controllers for estimating an exposure e.g. as defined by one or more exposure parameters of which one is exposure time for an imaging device, especially for estimating an exposure e.g. as defined by exposure parameters of which exposure times are one example that provide maximum saturation levels while keeping the image sensor operating within its linear range. Software is also provided to carry out all or many of the method steps.

BACKGROUND

Imaging devices can be implemented with a multispectral light source in order to increase the imaging quality. A multispectral light source can be subdivided into groups of light sources where each group can emit light within a certain bandwidth. Each group may comprise one or more individual light sources. To obtain high quality images of objects illuminated with a multispectral light source, it is required that the light source and the image sensor use appropriate settings (such as the ISO exposure standard, LED currents or exposure time). A common method for determining the exposure time is to use an auto-exposure procedure where the exposure settings are iteratively changed until a good image quality is obtained. This is time consuming, and if the light conditions change the procedure often has to be repeated.

SUMMARY OF THE INVENTION

It is an object of the present invention to provide a good method and/or system and/or controller for estimating an exposure, e.g. defined by one or more exposure parameter, of which an exposure time for an imaging device can be one of them.

It is an advantage of at least some embodiments of the present invention to be able provide a time efficient method or system for estimating good exposures e.g. as defined by exposure parameters such as exposure times that provide a high e.g. maximum saturation level of pixels of an image sensor while keeping the image sensor operating within its linear range.

Embodiments of the present invention provide methods and systems for exposure control of a light source, exposure control of an image sensor, or a combination thereof.

Embodiments of the present invention can apply to any type of imaging device comprising an external or embedded image sensor and an external or embedded light source. Such a device may be a dermatoscope, a laparoscope, an endoscope, a microscope, or any digital media devices such as mobile phones, tablets, laptops etc. Embodiments of the present invention can be described as comprising solid state light sources of which an LED or OLED are such solid state light sources. The present invention may however be implemented with any other type of solid-state light source.

In one embodiment of the present invention there is provided a method for estimating an exposure, e.g. as defined by one or more exposure parameters of which exposure time is one example, for an imaging device that can comprise:

a solid state light source arranged into at least one type 1 group and (zero or) one or more type 2 light source groups, the light source groups can emit light within wavelength bands wherein the wavelength bands of the type 2 light source group is larger than that of any light source group of type 1. The embodiment can further comprise an image sensor having digital sensor values adopting a saturation level and an image processor that can receive the digital sensor values. The method can comprise the steps of for each of the type 1 light source groups illuminating an object during an initial exposure e.g. as defined by one or more exposure parameters such as exposure time the image sensor can capture an image of the object and mapping the image onto the digital sensor values the image processor can then be adapted to store the digital sensor values, for example in a histogram, and extracting the 98 or 95-98 percentile of a predetermined saturation level (alternatively any of 75, 85, 95, 98, 99, 99.5, 100 percentiles)

and calculating the improved exposure e.g. as defined by one or more exposure parameters (of which exposure time is an example) of each of the type 1 light source groups by multiplying the initial exposure time ($T_{exp,wide}$ or other exposure parameter) of each of the type 2 light source groups with a constant (C), and with the predetermined saturation level (maxsat) of the image sensor divided by the measured 98 or 95-98 percentile (alternatively any of 75, 85, 95, 98, 99, 99.5, 100 percentiles) saturation level ($PCT_{wide}$), the constant being a function of an exposure time of a type 2 group. See equation (4).

For each of the type 2 light source groups, if any, estimating an improved exposure such as the improved exposure time for the type 1 group by using the initial exposure time of the type 1 group.

This has the advantage of being able to obtain an exposure e.g. as defined by one or more exposure parameters of which an exposure time that corresponds to a predetermined saturation level is one of them. Further the method can enable a reduction of the necessary number of measurements and estimating the exposure such as one or more exposure parameters of which the exposure time for some light source groups is one example.

Additionally or alternatively, the method can comprise a reference target and for each type 1 light source group setting the constant C to 95-98 percentile (($PCT_{wide}$) saturation level of a type 2 light source group (alternatively any of 75, 85, 95, 98, 99, 99.5, 100 percentiles) and dividing it by the corresponding exposure time (or other exposure parameter) of the type 2 light source group ($T_{exp,wide}$), and further dividing by the 95-98 percentile saturation level ((alternatively any of 75, 85, 95, 98, 99, 99.5, 100 percentiles) of the type 1 light source group ($PCT_{group}$) divided by the corresponding exposure time ($T_{exp,group}$ or other exposure parameter) for the type 1 light source group (see equation 4).

$$T_{exp,group} = (C \times (\text{maxsat} - \text{black}) \times T_{exp,wide}) / (PCT_{wide} - \text{black}) \quad (3)$$

Similar to above, "maxsat" is the desired maximum linear saturation level and "black" corresponds the image sensor off-set. $PCT_{wide}$ is the percentile saturation level for the white group such as an OLED or LED group. For example, a 95-98 percentile can be used. Alternatively any of 75, 85, 95, 98, 99, 99.5, 100 percentiles can be used. To compensate for using $PCT_{wide}$ for all LED or OLED groups, an exposure factor $C_{group}$ is introduced. $C_{group}$ is given for each group or color by $$C_{group}=(PCT_{wide}-black)/T_{exp,wide}/(PCT_{group}-black)/T_{exp,group} \quad (4)$$

$C_{group}$ is the constant C for type 1 light source groups, which have narrow bandwidths like a single colour, e.g. red blue or green.

A clarified description is provided in equations (3 clarification) and (4 clarification):

$$T_{exp,group}=(C\times(maxsat-black)\times T_{exp,wide})/(PCT_{wide,skin}-blaCk_{skin\ meas}) \quad (3\ clarification)$$

An exposure factor $C_{group}$ is introduced for constant C for each group or color by:

$$C_{group}=(PCT_{wide,reference}-black_{reference\ meas})/T_{exp,wide}/(PCT_{group}-black)/T_{exp,group} \quad (4\ clarification)$$

The term "maxsat" is the desired saturation level and "black" corresponds to the image sensor off-set. $PCT_{wide}$ is the percentile saturation level for the type 2 light source group. For example, a 95-98 percentile can be used (alternatively any of 75, 85, 95, 98, 99, 99.5, 100 percentiles can be used).

$T_{exp,\ wide}$ and $T_{exp,group}$ are the exposures such as defined by one or more exposure parameters of which exposure times are one example for the wide type 2 light source group and the colored type 1 group respectively and can be obtained from a calibration file. For example, for blue, $C_{blue}$ would be calculated with the $PCT_{blue}$ and $T_{exp,blue}$ from the calibration file. All exposure factors $C_{group}$ can be calculated and stored in a database on beforehand. For example, the factory calibration values can be used for the exposure factor. To compensate for using $PCT_{wide}$ for all light source groups, an exposure factor $C_{group}$ is introduced for type 1 light source groups. $C_{group}$ is given for each group or color by equation (4). Note that $PCT_{wide}$ in equation (3) is derived from the image of the actual object to be investigated, while the $PCT_{wide}$ in the equation (4) is derived from the image of a reference target during the calibration phase. The same is valid, mutatis mutandis for the black level. This means that the $PCT_{wide}$ in equation (as shown in 3 clarification) is derived from the image of an actual body such as a biological tissue of which skin is an example. Hence it is referred to as $PCT_{wide,\ skin}$. The same applies to black: $-black_{skin\ meas}$.

The $PCT_{wide}$ in the equation (4) is derived from the image of a reference target during the calibration phase. Hence in 4 clarification it is shown as $PCT_{wide,\ reference}$. The same applies to black: $-black_{reference\ meas}$ This has the advantage of providing the correlation of the estimated type 1 light source group with the type 2 light source group used in the estimations.

Additionally or alternatively, the method can comprise the image sensor having an off-set current and the method comprising decreasing the saturation levels with a value corresponding to the off-set current.

This has the advantage of improving the accuracy of the measured values.

Additionally or alternatively, the method can comprise multiplying the exposure times (or other exposure parameter) with an object depending weight factor between 0 and 1.

This has the advantage of providing a correction factor for different types of objects. Such need for correction can be determined experimentally.

Additionally or alternatively, the method can comprise setting the predetermined saturation level to the highest linear saturation level of the image sensor, for example 60-80 percent.

In another embodiment of the present invention there is provided a system for estimating an exposure e.g. as defined by one or more exposure parameters of which an exposure time is an example, for an imaging device comprising a solid state light source arranged into at least one type 1 group and (zero or) one or more type 2 light source group. The light source groups can have wavelength bands wherein the wavelength bands of the type 2 light source group is preferably larger than any light source group of type 1. The system can further comprise: an image sensor having digital sensor values adopting a saturation level and an image processor receiving the digital sensor values.

The system can be configured to implement the steps of for each of the type 1 light source groups
  illuminating an object during an initial exposure time
  the image sensor capturing an image of the object and mapping the image onto the digital sensor values
  the image processor being adapted for storing the digital sensor values, for example in a histogram, and extracting the 98 or 95-98 percentile of a predetermined saturation level (alternatively any of 75, 85, 95, 98, 99, 99.5, 100 percentiles can be used) and calculating the exposure time for a type 1 light source group by multiplying the initial exposure time for a type 2 light source group with a constant,
  and with the predetermined saturation level of the image sensor divided by the measured 98 or 95-98 percentile saturation level (alternatively any of 75, 85, 95, 98, 99, 99.5, 100 percentiles can be used) wherein the constant is a function of an exposure time of a type 2 group. See equation (4).

For example, for each of the type 2 light source groups, if any, estimate an improved exposure time of the type 1 group by using the initial exposure time of a type 1 group.

This has the advantage of providing a system for obtaining an exposure time that corresponds to a predetermined saturation level. Further the system can enable a method for reducing the necessary amount of measurements and estimating the exposure time for some light source groups.

Additionally or alternatively, the system can comprise a reference target, wherein for each type 1 light source group the constant C can be the 95-98 percentile saturation level (alternatively any of 75, 85, 95, 98, 99, 99.5, 100 percentiles can be used) of a type 2 light source group divided by the corresponding exposure time of the type 2 light source group, divided by the 95-98 percentile saturation level (alternatively any of 75, 85, 95, 98, 99, 99.5, 100 percentiles can be used) of the type 1 light source group divided by the corresponding exposure time for the type 1 light source group.

This has the advantage of providing a system which can correlate the estimated exposure e.g. as defined by one or more exposure parameters for the type 1 light source group with the type 2 light source group used in the estimation.

Additionally or alternatively, the system can comprise that the image sensor has a current off-set and the saturation levels are decreased with a value corresponding to the off-set current. This has the advantage of improving the accuracy of the measured values.

Additionally or alternatively, the system can comprise that the exposure times are multiplied with an object depending weight factor between 0 and 1.

This has the advantage of providing a correction factor for different types of objects. Such a factor can be determined experimentally.

Additionally or alternatively, the system can comprise that the predetermined saturation level is the highest linear saturation level of the image sensor, for example 60-80 percent.

In another embodiment of the present invention there is provided a controller for estimating an exposure e.g. as defined by one or more exposure parameters, of which exposure time is an example for an imaging device comprising a solid state light source arranged into at least one type 1 group and (zero or) one or more type 2 light source groups. The light source groups can have wavelength bands wherein the wavelength bands of the type 2 light source group can be larger than any light source group of type 1. The controller can further comprise an image sensor having digital sensor values adopting a saturation level and an image processor receiving the digital sensor values.

The controller can be configured to implement the steps of
for each of the type 1 light source groups
illuminating an object during an initial exposure time
the image sensor capturing an image of the object and
mapping the image onto the digital sensor values
the image processor being adapted for storing the digital sensor values, for example in a histogram, and extracting the 98 or 95-98 percentile of a predetermined saturation level (alternatively any of 75, 85, 95, 98, 99, 99.5, 100 percentiles can be used), and calculating the improved exposure, e.g. as defined by one or more exposure parameters such as the improved exposure time of the type 1 light source groups by multiplying the initial exposure time of the type 2 light source groups with a constant and with the predetermined saturation level of the image sensor divided by the measured 98 or 95-98 percentile (alternatively any of 75, 85, 95, 98, 99, 99.5, 100 percentiles can be used) saturation level (see equation 3), wherein the constant is a function of an exposure such as an exposure time of a type 2 group. See equation (4).

For example, for each of the type 2 light source groups, if any, estimating an improved exposure time of the type 1 group by using the initial exposure time of a type 1 group.

This has the advantage of providing a controller for obtaining an exposure e.g. as defined by one or more exposure parameters of which exposure time is one example that corresponds to a predetermined saturation level. Further the controller can enable a method for reducing the necessary number of measurements and estimating the exposure e.g. as defined by one or more exposure parameters of which exposure time for some light source groups is one example.

Additionally or alternatively, the controller can comprise a reference target, wherein for each type 1 light source group the constant can be the 95-98 percentile saturation level of a type 2 light source group (alternatively any of 75, 85, 95, 98, 99, 99.5, 100 percentiles can be used) divided by the corresponding exposure (as defined by one or more exposure parameters of which exposure time is one), of the type 2 light source group, divided by the 95-98 percentile saturation level (alternatively any of 75, 85, 95, 98, 99, 99.5, 100 percentiles can be used) of the type 1 light source group divided by the corresponding exposure time (or any other exposure parameter) for the type 1 light source group.

This has the advantage of providing a controller which can correlate the estimated type 1 light source group with the type 2 light source group used in the estimation.

Additionally or alternatively, the controller can comprise that the exposure times are multiplied with an object depending weight factor between 0 and 1. If there are differences with different objects then the object depending weight factor can be used to allow for such differences. The object depending weight factor can be determined experimentally.

Additionally or alternatively, the controller can comprise that the predetermined saturation level is the highest linear saturation level of the image sensor, for example 60-80 percent.

In another embodiment of the present invention there is be provided a computer program product comprising code which when executed on a processing device can carry out any of the above mentioned method steps.

In another embodiment of the present invention there is provided a machine readable non-transient storage means which can store the above mentioned computer program product. Such machine readable non-transient storage means can be an optical disk such as a CD-ROM or a DVD-ROM, a magnetic tape, a hard disk, a solid state memory such as a flash memory, or similar.

BRIEF DESCRIPTION OF DRAWINGS

FIG. 7 shows a table comprising an example indicating images per light type to be used in the estimations according to an embodiment of the present invention.

DEFINITIONS

Figure 1:
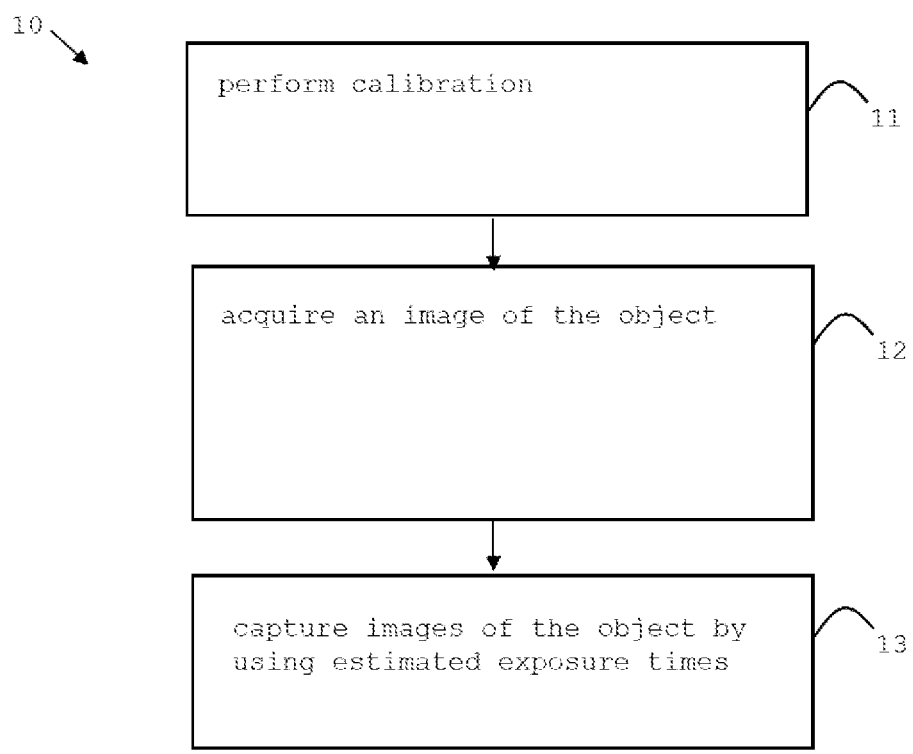
FIG. 1 shows a flow chart comprising an embodiment of the present invention.

An "imaging device" can be any type of device or instrument comprising an image sensor, for example a dermatoscope, laparoscope, endoscope, microscope, or any digital media device, such as mobile phone, tablet, laptop, etc. An imaging device has access to an embedded or external image sensor and an embedded or external light source.

Embodiments of the present invention provide methods and systems and controllers for exposure control of a light source, exposure control of an image sensor, or a combination thereof.

Embodiments of the present invention provide any or all of:

use of (a) white and/or coloured light source(s);
  estimation of an exposure, e.g. as defined by one or more exposure parameters such as an exposure time of a light source, image sensor, or a combination thereof;
  (pre) exposure for an initial (short) length of time;
  determination of the sensor output (e.g. digital sensor values DSV) which results from an initial exposure, using a known sensor characteristic; and/or
  extrapolation to a light source exposure, e.g. exposure parameter such as exposure time, image sensor exposure such as exposure time, or a combination thereof, e.g. an exposure such as an exposure time which causes the maximum number of DSV in the linear range.

An "image sensor" is a sensor that can detect and acquire a signal of electromagnetic radiation (arranged in an image or a pattern), and transform the signal into an electrical signal. The image sensor is in most cases digital. The electrical signal per pixel which the image sensor stores when it acquires an image signal, can be mapped onto a "digital pixel value", "pixel value" or a "Digital Sensor Value", DSV. The underlying physical entity of the DSV can be luminance (e.g. expressed in Candela per square meter), even though the DSV itself does not have a unit but can be seen as a saturation level, often expressed in a percentage of full saturation. A percentile x of a saturation level y is when x percent of all sensors or pixels of an image sensor has reached a saturation level below or equal to y %. For example, when 98 percent of all pixels have a saturation level below or equal to 80%, the 98 percentile is 80%.

An image sensor can map the incoming radiation to a DSV per sensor unit or pixel. This can be done for three sensor types or channels representing primary colors e.g. red, green and blue respectively. Thus, each channel can have a saturation level, and also a linear region where the DSVs respond linearly to the exposure, e.g. exposure time. The image sensor can be connected to an image processor which can extract the DSVs for further manipulation.

The underlying physical entity of the DSV can be luminance (e.g. expressed in Candela per square meter), even though the DSV itself does not have a unit but can be seen as a saturation level, usually expressed in a percentage of full saturation.

Embodiments of the present invention can be applied on the image sensor side or on the illumination side or both, i.e. splitting the exposure such as one or more exposure parameters such as the exposure time between the sensor and illumination side. A typical example of an exposure is that a camera may determine the exposure time with a shutter, or the exposure time may be determined by a flash device if the shutter stays open long enough.

An "image processor" can be part of a central processing unit which can comprise an electronic circuit that can perform operations on a data set. An "image processor" can be part of a standalone, separate or embedded controller.

A "solid state light source" can comprise one or more sub-type of light sources arranged into groups where all light sources within a group have the same characteristics. These can comprise solid state light sources such as LEDs or OLED's or LED or OLED groups. Any mention of a solid state light source can be replaced by a LED or OLED or a LED or OLED group.

A "multispectral solid state light source" or just "multispectral light source" can emit light in several wavelength bands. It can comprise "groups" of light sources for each wavelength band. A group can be one or more light sources. Each wavelength band can be selected separately, i.e. each group can be selected separately. For example, an "LED group" can be a collection of LEDs of the same type that emits light of the same type and wavelength. In many cases, the LEDs of an LED group are operated simultaneously.

A light source can comprise a solid state light source such as an LED or OLED light source having at least one color filter. This allows different coloured light sources to be generated.

"Type 1 and 2 Light Source Groups"

In embodiments of the present invention a solid state light source can be arranged into at least one type 1 group and one or more type 2 light source groups.

The light source groups can emit light within wavelength bands wherein the wavelength bands of the type 2 light source group are larger than that of any of type 1 light source group. Hence, the bandwidths of type 1 and type 2 groups differ because the wavelength bands of the type 2 light source group are larger than any light source group of type 1.

Each solid state light source group i ($1<=i<=n$) can be enabled to illuminate an object. The object may be for example biological tissue such as skin, or other types of tissue from humans or animals. Each solid state light source group i ($1<=i<=n$) can illuminate the object using an initial drive current for the solid state light sources and with an exposure such as an exposure time, which are known or can be obtained from a factory calibration. An advantage of this is a further reduction in the acquisition time by replacing a step for the full solid state light source group by using one solid state light source group that has a sufficiently wide bandwidth to cover the bandwidth of one or more of the other solid state light source groups. This wideband group can for example be a white solid state light source group.

Each type 2 light source group has a bandwidth that covers the bandwidth of type 1 light source groups. Therefore, there is a particular solid state light source group (the type 2 light source referred to as the first light source group) whose bandwidth is greater than other groups (type 2 light source groups referred to as second light source groups) but this particular group does not have to be a white group. This particular group can for example be a white solid state light source group. Hence a "wide" bandwidth does not mean white necessarily but white has of course (by its nature) a "wide bandwidth".

A type light source group can comprise a narrower wavelength band, e.g. covering one color and can be referred to as a second light source group and a type 2 light source group (comprising a wider wavelength band, e.g. covering white) can be referred to as a first light source group.

A requirement can be that the coverage of all wavelength bands in the type 1 group is large enough so that it covers any wavelength band in the type 2 group (e.g. the individual colors such as blue, green and red) for which the exposure time is calculated. One solid state light source group can be used that has a sufficiently wide bandwidth to cover the bandwidth of one or more of the other solid state light source groups. The wavelength bands of the type 2 light source group are larger than the wavelength band of any light source group of type 1 or wherein the wavelength bands of the type 2 light source group cover the wavelength band of any light source group of type 1.

Accordingly, in embodiments of the present invention for each of the type 2 light source groups illuminating an object during an initial exposure time the image sensor captures an image of the object and maps the image onto the digital sensor values, an image processor being adapted to store the digital sensor values and for extracting those in at least a first percentile such as the at least 90 percentile of a predetermined saturation level (alternatively any of 75, 85, 95, 98, 99, 99.5, 100 percentiles can be used), and calculating the exposure such as the exposure time by multiplying the initial exposure such as intial exposure time of a type 2 light source group with a constant and with the predetermined saturation level of the image sensor divided by the measured at least first percentile such as at least 90 percentile saturation level (alternatively any of 75, 85, 95, 98, 99, 99.5, 100 percentiles can be used) and for each of the type 2 light source groups, if any, estimating the improved exposure time by using the initial exposure time of a type 1 light source group.

A "saturation level" refers to a "level of saturation" being for example a percentage of full saturation. It is an advantage of at least some embodiments of the present invention to be able provide a time efficient method for estimating good exposure exposures, e.g. as defined by one or more exposure parameters such as exposure times that provide a maximum saturation level while keeping the image sensor operating within its linear range.

A "saturation level" does not mean automatically full saturation, but is rather a percentage of full saturation. Thus, at the 98 percentile of 79% of the full saturation level there are no saturated pixels in the 98 percentile since the pixel values are at most 79% of full saturation. Hence 98% of the pixels have 79% of full saturation or less, whereas 2% have above 79% saturation so that some pixels in this 2% can be saturated and can have a non-linear behaviour. The non-linear output behaviour can start, for example after the 80% line.

"Exposure Factor"=Constant $C_{group}$

To compensate for using values of the type 2 light source group such as $PCT_{wide}$ for all type 1 light source groups such as LED or OLED groups, an exposure factor $C_{group}$ is introduced. $C_{group}$ is given for each group or color by $$C_{group} = (PCT_{wide} - \text{black})/T_{exp,wide}/(PCT_{group} - \text{black})/T_{exp,group} \quad \text{equation (4)}$$

$T_{exp,wide}$ and $T_{exp,group}$ are the exposure such as exposure times for the wide and colored LED or OLED group respectively and can be obtained from a calibration file. For example, for blue, $C_{blue}$ would be calculated with the $PCT_{blue}$ and $T_{exp,blue}$ from the calibration file. All exposure factors $C_{group}$ can be calculated and stored in a database beforehand. For example, the factory calibration values can be used for the exposure factor.

The assumption that the exposure factor $C_{group}$ is constant, is only true if the spectral reflectance curve of the object being imaged (e.g. biological tissue such as skin) has the same shape as the spectral reflectance curve of a white reference reflector, which can be unlikely. Therefore, the estimated exposure time $T_{exp,group}$ may be too high or too low to obtain a desired exposure such as 80%. An underexposure is unfortunate because the sensor's dynamic range is not fully used, but it is not necessarily a problem. An overexposure, however, is problematic because it results in loss of information. The constant $C_{group}$ describes how a color (e.g. green) relates to the chosen reference color (e.g. white).

"Object Depending Weight Factor"

The method and system according to embodiments of the present invention preferably comprises that the exposures such as the exposure times are multiplied with an object depending weight factor between 0 and 1. This allows an adaption to certain objects if this is found to be necessary. Values may be determined experimentally the for object depending weight factor.

"Use of Exposure Time"

The exposure such as exposure time can be used, for example, to capture good images of an object, and the skilled person knows how to use the exposure such as exposure time to obtain image control, either from the image sensor side or from the light source side.

The exposure such as exposure time or the sensor exposure time is an "exposure parameter". Other exposure parameters can be e.g. LED current, sensor exposure time, sensor analog gain, sensor digital gain, light source brightness or optical aperture. These all individually, in combinations or all of them can contribute to the exposure.

A change in the sensor exposure such as exposure time can be expressed as a change in any of—or a multiple of the other exposure parameters.

An "object" to be imaged can be a biological tissue, e.g. skin, internal organ tissue, teeth or bone tissue. The object can comprise living and/or dead tissue.

DETAILED DESCRIPTION OF THE INVENTION

Embodiments of the present invention can provide a time efficient method for estimating exposure times that provides maximum saturation level while keeping the image sensor operating within its linear range.

Embodiments of the present invention can apply to any type of imaging device comprising an external or embedded image sensor and an external or embedded light source. Such a device may be a dermatoscope, a laparoscope, an endoscope, a microscope, or any digital media devices such as mobile phones, tablets, laptops etc. Embodiments of the present invention can be described as comprising an LED or OLED light source. The present invention may however be implemented with any type of solid-state light source.

In one embodiment of the present invention there is provided a method for estimating an exposure e.g. as defined by one or more exposure parameters such as an exposure time for an imaging device that can comprise a solid state light source arranged into at least one type 1 group and zero or one or more type 2 light source groups, the light source groups can emit light within wavelength bands wherein the wavelength bands of the type 2 light source group is larger than that of any light source group of type 1. The embodiment can further comprise an image sensor having digital sensor values adopting a saturation level and an image processor that can receive the digital sensor values. The method can comprise the steps of for each of the type 1 light source groups illuminating an object during an initial exposure time the image sensor can capture an image of the object and mapping the image onto the digital sensor values the image processor can then be adapted to store the digital sensor values, for example in a histogram, and extracting the 98 or 95-98 percentile (alternatively any of 75, 85, 95, 98, 99, 99.5, 100 percentiles can be used) of a predetermined saturation level and calculating the exposure time by multiplying the initial exposure time with a constant and with the predetermined saturation level of the image sensor divided by the measured 98 or 95-98 percentile saturation level (alternatively any of 75, 85, 95, 98, 99, 99.5, 100 percentiles can be used)

and for each of the type 2 light source groups, if any, estimate the exposure time by using the improved exposure time of a type 1 group.

This has the advantage of being able to obtain an exposure time that corresponds to a predetermined saturation level. Further the method can enable a reduction of the necessary amount of measurements and estimating the exposure time for some light source groups.

Embodiments of the present invention can be applied on the image sensor side or on the illumination side or both, i.e. splitting the exposure time between sensor and illumination side. A typical example is that a camera may determine the exposure time with a shutter, or the exposure time may be determined by a flash device if the shutter stays open long enough.

Figure 5:
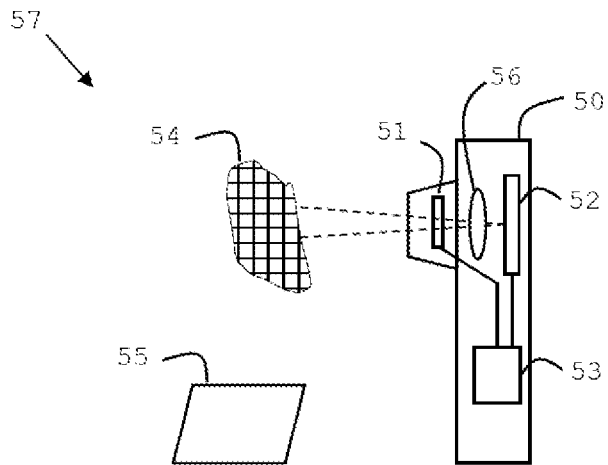
FIG. 5 shows an system set-up comprising an embodiment of the present invention.

FIG. 5 shows a system 57 comprising an embodiment of the present invention. The system 57 comprises an imaging device 50 having or for use with a light source 51 and an image sensor 52, an embedded image processor 53, and an optical system such as a lens system 56. The image sensor can be a coloured light image sensor 53, e.g. with R, G, B channels. Alternatively, the image processor 53 can be an external image processor. The light source 51 and the image sensor 52 are connected to the image processor 53 or can be connected to an external image processor. The system 57 further comprises an object to be investigated 54 (e.g. biological tissue such as human skin), and a reference sample 55 (e.g. a white reference sample) to be used for calibration. The light source 51 can comprise solid state light sources such as discrete light sources which can be LEDs or OLED's or LED or OLED groups. The light source 51 can comprise n groups. System 57 can implemented using a controller such as a microcontroller or an embedded controller. The controller can be made removable which allows major updates to be carried out by replacing the controller.

1. First Embodiments

FIG. 1 shows a high-level flow chart 10 comprising an embodiment of the present invention. The method in flow chart 10 can be implemented on a suitable system such as the system 57 of FIG. 5.

The method comprises extracting the DSVs (digital sensor values) from images of the object 54 illuminated with the light source 51, with an initial exposure e.g. as defined by one or more exposure parameters of which exposure time is one example. An appropriate initial exposure time (e.g. one which avoids saturated- or too low DSVs) can be obtained by initially performing a one-time calibration or a "factory calibration". In step 11 such a calibration can be performed for each solid state light source group I such as LED or OLED group i, using the white reference target 55. Various initial parameters can be extracted and stored in a calibration file, for example a .json-file. If appropriate initial settings are already known, these can replace step 11. It is included within the scope of the present invention that exposures such as exposure times are stored and re-used. Exposures can be defined by one or more exposure parameters of which exposure times are one example.

In step 12, the appropriate initial exposure time e.g. obtained from a factory calibration can be used for the light source 51 and the image sensor 52 to acquire an image of the object 54. The image capturing can be performed for each of the n solid state light sources such as LED or OLED groups. The image capturing can be performed in sequence for one of the n solid state light sources such as LED or OLED groups after another. The image sensor 52 can map the image onto DSVs and arrange them in a graphical display of numerical quantitative data of which a histogram is one example. This can be done for each R, G, B channel of the image sensor 52. Then a measured saturation level, for example 98 percentile or 95-98 percentile can be extracted from the graphical display such as the histogram and used to calculate an improved estimated exposure time or times. The "95-98 percentile" can be any of 98 percentile or 95 percentile or an x percentile with x in the range between 95 and 98. Alternatively any of 75, 85, 95, 98, 99, 99.5, 100 percentiles can be used. This procedure can be performed for all solid state such as LED or OLED groups. Then in step 13 the estimated exposure times can be used to capture images of the object 54. Exposures can be defined by one or more exposure parameters of which exposure times are one example. A more detailed description of these method steps will now follow.

Figure 2:
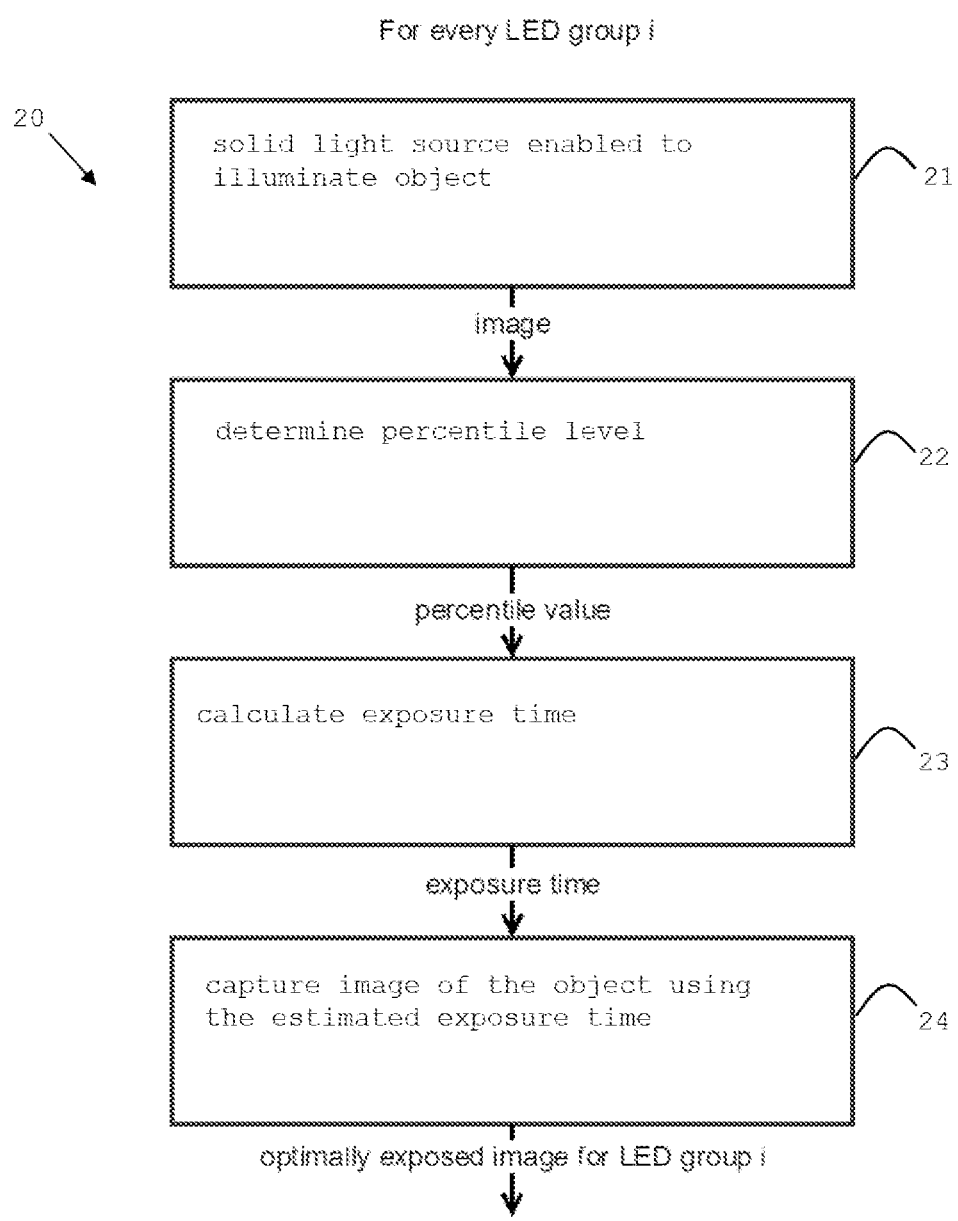
FIG. 2 shows a flow chart comprising an embodiment of the present invention.

FIG. 2 shows a flow chart 20 of an embodiment of the present invention. The steps 21 to 24 can be implemented for some or all of the solid state light source such as LED or OLED groups by using the system 57. In step 21 each solid state light source such as LED OR OLED group i ($1 \leq i \leq n$) can be enabled to illuminate the object 54, using an initial drive current such as an initial solid state light source such as LED or OLED current and exposure time, which are known or can be obtained from a factory calibration. Exposures can be defined by one or more exposure parameters of which exposure times are one example.

In a factory calibration, all solid state light spruce e.g. LED or OLED groups can be sequentially enabled to illuminate a white reference target 55. A "low exposure time", for example 1 to 4 milliseconds can be chosen so as to not saturate the image sensor. Exposures can be defined by one or more exposure parameters of which exposure times are one example. The image processor can receive the DSVs of each image sensor channel and determine the percentage of saturation for this channel. This can be done by having the processor arranging the DSVs of one channel (e.g. red) and extract the percentage of saturation for a certain percentile (e.g. 95-98 or 98, alternatively any of 75, 85, 95, 98, 99, 99.5, 100 percentiles can be used). If the light is e.g. "primarily red", the red channel will give the highest percentage of saturation. This percentage can then be chosen to represent the percentage of saturation of the red channel using the "primarily red" light and the "low exposure time". The image processor can be part of a standalone, separate or embedded controller.

When the image has been mapped onto DSVs, the image processor can arrange the DSVs in a graphical display of numerical quantitative data of which a histogram is an example and determine the 95-98 or 98 percentile saturation level (step 22). Alternatively any of 75, 85, 95, 98, 99, 99.5, 100 percentiles can be used.

Alternatively, the values can be sorted in value bins with the same resolution as the measured DSVs or with more than one DSV per bin. The image processor can be part of a standalone, separate or embedded controller.

Figure 3A:
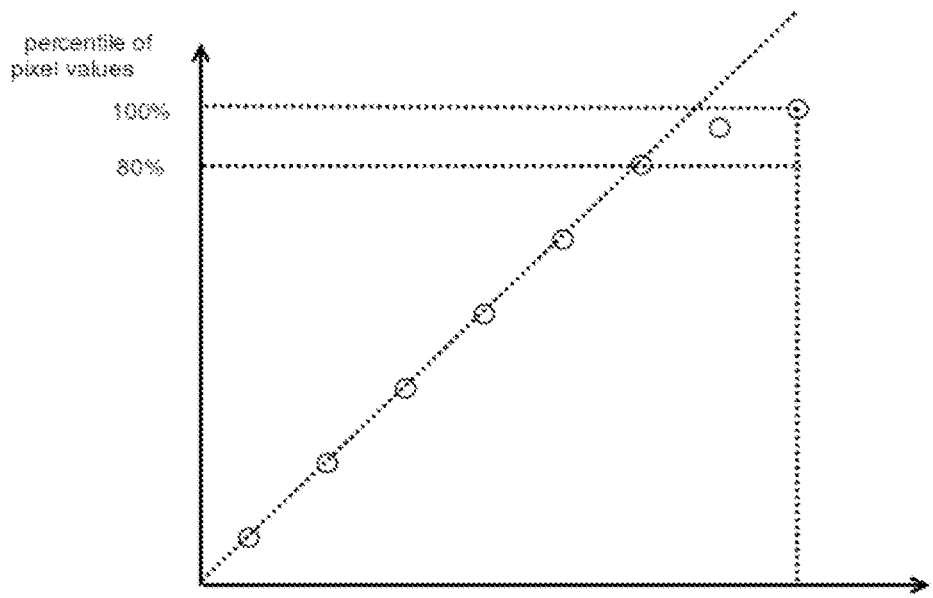
FIG. 3A and FIG. 3B show the 98 percentile of saturation levels for different exposure times.
Figure 3B:
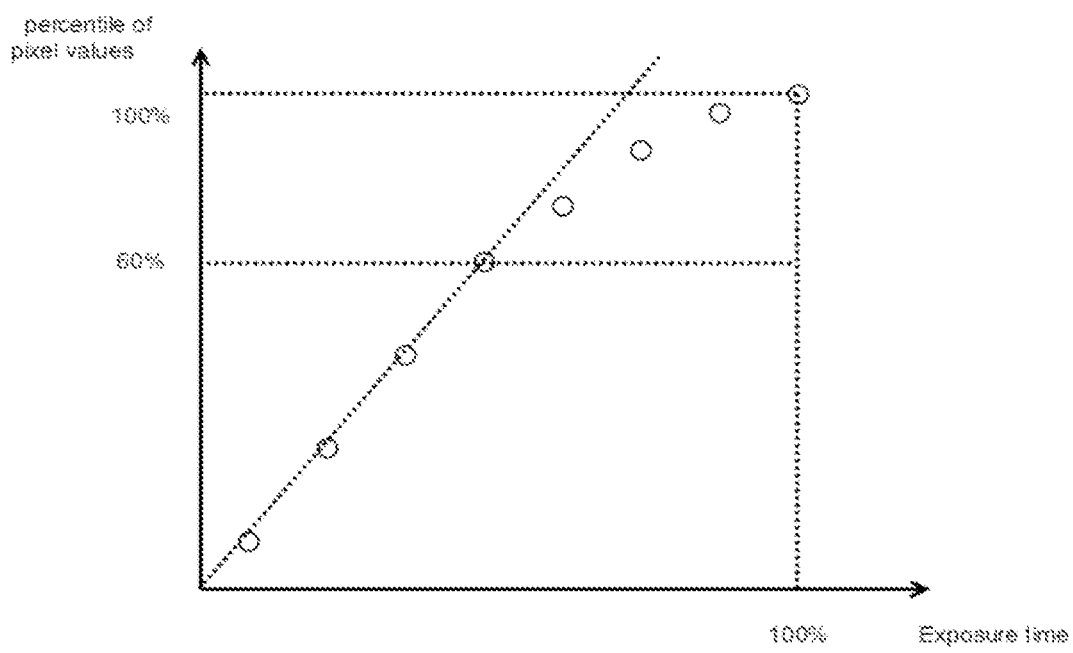

It is desirable to have the image sensor operating in its linear range in order to obtain reliable relationship between the exposure time and the DSVs. The linear range varies with the type of image sensor used. FIGS. 3A and 3B show the 98 percentile of pixel value or DSV as a function of exposure time for two different image sensors, respectively.

It can be seen that the DSVs of the image sensors in FIGS. 3A and 3B respond linearly for DSVs up to 80% and 60% respectively.

Thus, for the image sensor in FIG. 3A, it would be desirable to use the exposure time corresponding to 80% level of saturation in order to get as much light as possible within the linear range. It is however unlikely that the initial exposure time, e.g. obtained from a factory calibration, gives a DSV level of 80%. This exposure time "$T_{exp}$" can however be calculated in step 23 with equation (1) in which is comprised in the present invention, where the exposure time $T_{exp}$ corresponds to the desired maximum linear saturation level "maxsat". Exposures can be defined by one or more exposure parameters of which exposure times are one example.

$$T_{exp}=T_{exp,initial} \times (\text{maxsat}-\text{black})/(\text{PCT}-\text{black}) \quad (1)$$

The "$T_{exp,initial}$" is the initial exposure time from the factory calibration (or known upfront).

The "black" corresponds to an artificial DSV corresponding to an instrument off-set current which is present even if the image sensor does not detect any radiation. The "PCT" is the measured percentile of the most saturated image sensor channel (e.g. 98), as described above. Instead of the 98 percentile, a 95-98 percentile can be used in any of the embodiments of the present invention. Alternatively, any of 75, 85, 95, 98, 99, 99.5, 100 percentiles can be used.

FIGS. 3A and 3B each illustrate a percentile of the pixel values. As it refers to a percentile less than 100%, it means that all pixels are not represented in FIG. 3A or 3B. For the sake of discussion, let's say that it's the 98 percentile.

Accordingly; at the horizontal line of 80%, in FIG. 3A, representing the level of saturation, 98% of all pixels have a saturation level of 80% (or below) of maximum saturation. Therefore, 2% of all pixels can have a saturation level greater than 80%. Some of these can be saturated due to the non-linear sensor behaviour. Hence, reference to a 98 percentile with a saturation level of 80% or below refers to the pixels that are NOT fully/max/completely/ . . . saturated. Above the 80 percent saturation line there is indeed a possibility of saturation and non-linearity. But the present invention does not require these pixels in the non-linear ragion in any of the methods according to embodiments of the present invention. The same is valide, mutatis mutandis, for FIG. 3B at the horizontal line of 60%.

In a real implementation, it may be desirable to provide a limit for a maximum exposure time "maxexp", to avoid saturation. This can be obtained with letting a min function choose the maxexp value if this is the lower one, as in equation (2).

$$T_{exp}=\min(T_{exp,initial} \times (\text{maxsat}-\text{black})/(\text{PCT}-\text{black}), \text{maxexp}) \quad (2)$$

When steps 21 to 23 have been performed for all solid state light source groups such as LED or OLED groups i, the estimated $T_{exp}$ can be used in step 24 to capture an image with solid state or LED or OLED group i of object 54. Alternatively, step 21 to 23 can first be performed for all solid state such as LED or OLED groups i, and then the image capture in step 24 is performed.

Figure 4:
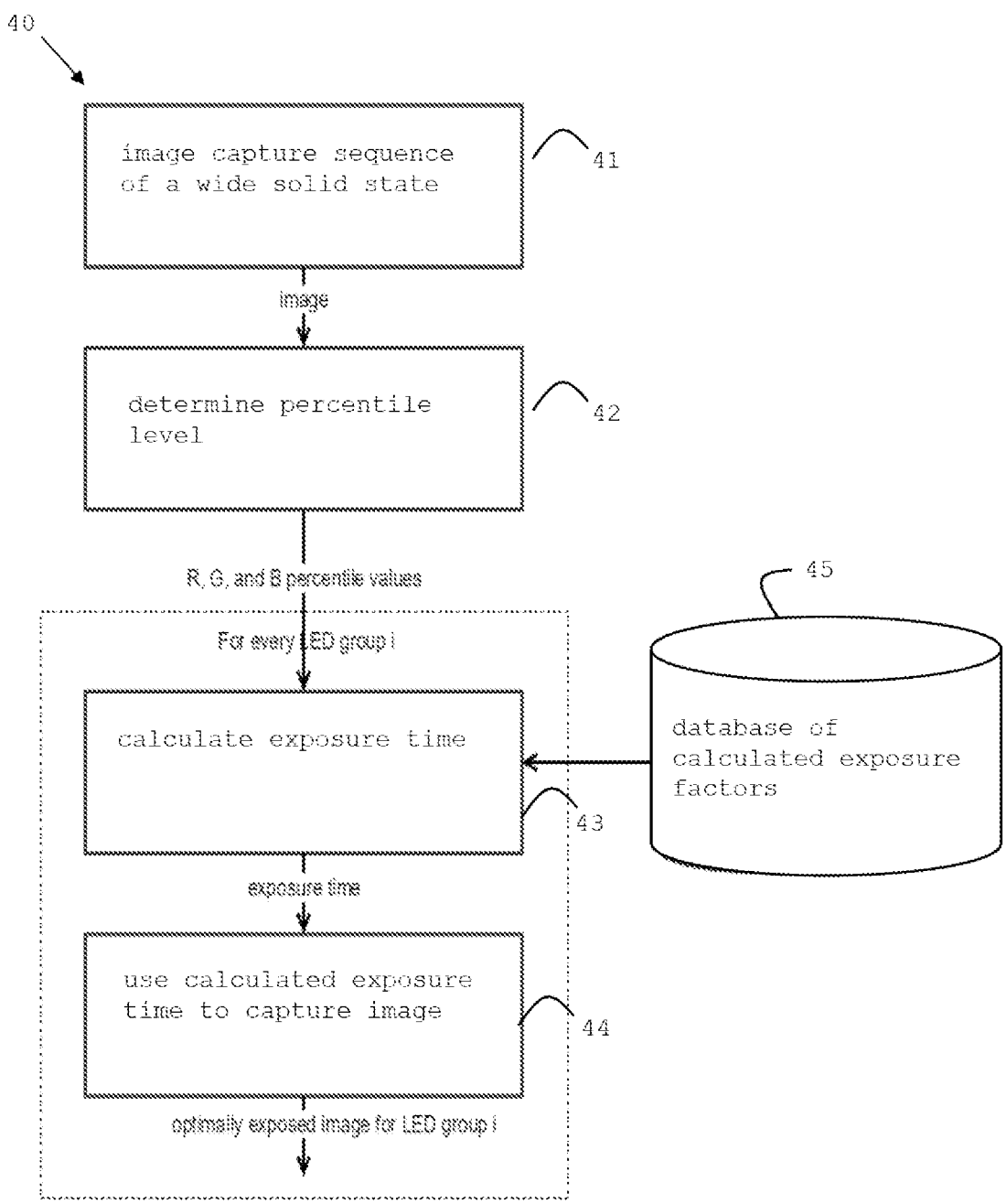
FIG. 4 shows a flow chart comprising an embodiment of the present invention.

FIG. 4 shows another embodiment of the present invention. The method in FIG. 2 involves two image capture sequences, step 21 and 24, for each solid state such as LED or OLED group of the light source. The inventors have found that it is possible to further reduce the acquisition time by replacing step 21 for the full solid state such as LED or OLED group by using one solid state such as LED or OLED group that has a sufficiently wide bandwidth to cover the bandwidth of one or more of the other solid state such as LED or OLED groups. This can for example be a white solid state such as LED or OLED group.

In this way step 21 will be replaced with step 41 comprising one image capture sequence of a wide solid state such as LED or OLED group. Similar to step 21, an appropriate solid state such as LED or OLED current and exposure time can be used, e.g. from a calibration file. In step 42 the image sensor can arrange the DSVs in a graphical display of numerical quantitative data of which a histogram is an example and the $PCT_{wide}$ can be obtained from the channel with highest percentile saturation level, as described above. For example, a percentile of 95-98 can be used. Alternatively, any of 75, 85, 95, 98, 99, 99.5, 100 percentiles can be used. Then, using equation (1) or (2), the estimated exposure time $T_{exp,wide}$ for the wide solid state such as LED or OLED group can be calculated.

In step 43, the estimated exposure times $T_{exp,group}$ for the remaining solid state such as LED or OLED groups can then be calculated (instead of derived from measurements) according to equation (3):

$$T_{exp,group}=(C \times (\text{maxsat}-\text{black}) \times T_{exp,wide})/(\text{PCT}_{wide}-\text{black}) \quad (3)$$

Similar to above, "maxsat" is the desired maximum linear saturation level and "black" corresponds the image sensor off-set. $PCT_{wide}$ is the percentile saturation level for the white solid state such as OLED or LED group. For example, a 95-98 percentile can be used. Alternatively any of 75, 85, 95, 98, 99, 99.5, 100 percentiles can be used. To compensate for using $PCT_{wide}$ for all solid state such as LED or OLED groups, an exposure factor $C_{group}$ is introduced. $C_{group}$ is given for each group or color by $$C_{group}=(PCT_{wide}-\text{black})/T_{exp,wide}/(PCT_{group}-\text{black})/T_{exp,group} \quad (4)$$

$T_{exp,wide}$ and $T_{exp,group}$ is the exposure time for the wide and colored solid state such as LED or OLED group respectively and can be obtained from a calibration file. For example, for blue, $C_{blue}$ would be calculated with the $PCT_{blue}$ and $T_{exp,blue}$ from the calibration file. All exposure factors $C_{group}$ can be calculated and stored in a database 45 on beforehand. For example, the factory calibration values can be used for the exposure factor.

The assumption that the exposure factor C is constant, is only true if the spectral reflectance curve of the object being imaged (e.g. skin) has the same shape as the spectral reflectance curve of the white reference reflector, which is unlikely. Therefore the estimated exposure time $T_{exp,group}$ may be too high or too low to obtain a desired exposure of 80%. An underexposure is unfortunate because the sensor's dynamic range is not fully used, but it is not necessarily a problem. An overexposure, however, is problematic because it results in loss of information. For this reason, we introduce a safety factor S for each solid state such as LED or OLED group, and adjust equation (3) to equation (5):

$$T_{exp,group}=(C \times (\text{maxsat}-\text{black}) \times T_{exp,wide})/(PCT_{wide}-\text{black}) \times S \quad (5)$$

where S varies between 0 and 1. The safety factors S can be determined experimentally based on a series of skin image captures from different people. The factors can be incrementally adjusted downwards whenever overexposure of a particular solid state such as LED or OLED group is encountered.

In step 44, the calculated exposure times $T_{exp,group}$ are used to capture an image with optimal or improved exposure time for each group i.

Alternatively, an intermediate number of groups can use estimated exposure times based on a wide LED group while that of the remaining groups are based on their measured saturation levels.

In another embodiment of the present invention an alternative procedure can be implemented for image capturing of dark objects, such as dark skin. If the initial exposure time in step 41 is based on a white reflective target, this may result in a very low first exposure on dark skins, and a poor estimate of the exposure times. The following measures may avoid this scenario:

- Graphical displays of numerical quantitative data such as histograms can be based on 12-bit pixel values instead of 8-bit values
- The initial exposure time in step 41 can be increased.
- The safety factors can be improved by analysing clinical images to improve.

2. Exemplary Second Embodiment

The present invention can be implanted with a Sony IMX274LQC image sensor, and white and colored LEDs from Vishay (VLMW1300, TLMS1100, TLMO1100, TLMY1100, TLMG1100, TLMP1100, TLMB1100). The LEDs were arranged in eleven different LED groups.

The exemplary embodiment uses the 98 percentile of a maximum saturation level (maxsat) of 80% for illustrative purposes, but the present invention is not limited hereto. Alternatively, any of 75, 85, 95, 98, 99, 99.5, 100 percentiles can be used.

2.1 Factory Calibration

The ISO can be set to 100 and the LED current values can be set to 180, to maximize the exposure possible, without the risk of the thermal safety mechanism to kick in.

The factory calibration can be done in two steps, using a white reference target (e.g. Bentham Instruments Diffuse Reflectance Standard 2866/1):

- Obtain a capture sequence for all LED groups with exposure time values which are sufficiently low (e.g. 1 to 4 milliseconds) in order to expose the white reference target well below a maximum saturation level of 80%. Histograms of this capture sequence can be used to calculate exposure times that will give a saturation level of 80%.
- Obtain a second capture sequence with the calculated exposure times. Then the following parameters for each of the LED groups can be stored in a calibration file:
- LED current (180)
- exposure time (1 to 4 milliseconds)
- black level (normalized to range 0.0-1.0)
- 98 percentile of red histogram (normalized to range 0.0-1.0)
- 98 percentile of green histogram (normalized to range 0.0-1.0)
- 98 percentile of blue histogram (normalized to range 0.0-1.0)

For every LED group, one of the channels R, G, or B can reach a saturation level of approximately 80%.

In the present example it can be assumed that any object will reflect less than this white target so that over saturated images or DSVs in the first measurement can be avoided.

3. Third Embodiment (Measuring all Groups)

The following settings can be adopted:
keep ISO value fixed at 100 for all captured frames use a fixed LED current value per LED group (different current value may be used for different LED groups), e.g. between 26.28-450 mA (which in this example corresponds to a numerical value between 101 and 200)

vary the exposure time to obtain an 80% saturation level of the 98 percentile, for the object being photographed (alternatively any of 75, 85, 95, 98, 99, 99.5, 100 percentiles can be used)

The rationale behind these choices can be:

ISO: keep ISO low for keeping low noise levels

LED current:
- the number of discrete LED current values (100) is low
- a thermal safety mechanism can prematurely turn off the LED for settings above 180, effectively limiting the number of discrete levels to 80
- the amount of emitted light relates non-linearly to the LED current, so we avoid the need to characterize this by keeping the current fixed (within each group)

Initial exposure time: should relate linearly to the resulting pixel values, which enables us to predict pixel values as a function of exposure time. Using a fraction (e.g. 50%) of the exposure time from a factory calibration, the initial exposure time can be set with a value between 0.014948 and 33.247260 msec.

The following steps can be implemented:

1. Take one series of exposures, one per LED group, with the a predetermined LED current and initial exposure time for each LED group.

2. Based on the 98 percentile of each image in step 1, the exposure time $T_{exp}$, can be estimated using equation (2a):

$$T_{exp} = \min(T_{exp,initial} \times (0.8-\text{black})/(\text{PCT98}-\text{black}), \text{max-exp}) \quad (2a)$$

where $T_{exp,initial}$ is the initial exposure time (in milliseconds) in step 1, 0.8 is the 80% saturation level, PCT98 is the 98 percentile of the most exposed channel (R, G, or B) in the image or DSVs from step 1, and black is the normalized off-set level. Alternatively, any of 75, 85, 95, 98, 99, 99.5, 100 percentiles can be used.

The new exposure time is limited to the maximum possible value of the image sensor (e.g. 33.24726 milliseconds). Depending on the object being imaged, the maximum exposure time may not be sufficient to obtain a saturation level of 80%.

Table 1 shows an example of LED currents and estimated exposure times, per LED group.

TABLE 1

| LED group no. | LED current | Exposure time (msec) |
|---|---|---|
| 0 | 180 | 3.5 |
| 1 | 180 | 3.1 |
| 2 | 180 | 3.1 |
| 3 | 180 | 8.0 |
| 4 | 160 | 3.1 |
| 5 | 180 | 2.8 |
| 6 | 160 | 3.8 |
| 7 | 180 | 3.1 |
| 8 | 180 | 5.0 |
| 9 | 180 | 4.4 |
| 10 | 160 | 8.6 |
| 11 | 140 | 5.3 |

3. Take a second series of exposures, one per LED group, with the new exposure times $T_{exp}$ calculated in step 2.

4. Fourth Embodiment (Using White LED Group)

The measured 98 percentile 80% saturation levels for the colored LEDs in step 1 can be replaced by that of the white LED (group 6). This assumes that the following ratio or exposure coefficient is constant:

$$C_{group}=(PCT98_{white}-black)/T_{exp,white}/(PCT98_{group}-black)/T_{exp,group} \quad (4a)$$

where $PCT98_{white}$ and $PCT98_{group}$ is the measured 98 percentile saturation level of the R, G, or B histogram of the white LED group and the colored LED groups, respectively (from whichever channel R, G or B which gives the highest value).

$T_{exp,white}$ and $T_{exp,group}$ denotes the exposure times for the white LED group and the colored LED groups, respectively. The exposure factor C can be calculated for every LED group, based on the calibration data in the calibration file. For the white LED, C is equal to 1. Table 2 shows the calculated exposure factors C.

TABLE 2

| Group | Factor | Channel |
|-------|--------|---------|
| 0 | 0.2624 | BLUE |
| 1 | 0.3306 | BLUE |
| 2 | 0.4887 | RED |
| 3 | 1.4917 | RED |
| 4 | 0.8315 | GREEN |
| 5 | 0.5672 | GREEN |
| 6 | 1.0 | GREEN |
| 7 | 0.6238 | GREEN |
| 8 | 0.7302 | BLUE |
| 9 | 0.6491 | RED |
| 10 | 1.0366 | RED |
| 11 | 1.4190 | GREEN |

Based on one capture of the white light group (6), we can estimate the appropriate exposure time for all colored LED groups with equation (3a):

$$T_{exp,group}=(C\times(maxsat-black)\times T_{exp,white})/(PCT_{white}-black) \quad (3a)$$

where $PCT_{white}$ is the measured percentile (e.g. 98) saturation value of the channel (R, G, or B) with the highest response of the white LED group.

$T_{exp,white}$ is the measured percentile saturation level of the white LED.

As described above, there can be a safety factor S for each LED group, which adjusts the formula to:

$$T_{exp,group}=(C\times(0.8-black)\times T_{exp,white})/(PCT98_{white}-black)\times S \quad (5a)$$

where S is a factor between 0.0 and 1.0. The estimated exposure time can now be calculated by using the single measurement of the white LED group, and inserted in step 3 above.

The image processor 53 described above as well as other devices for use with embodiments of the present invention can be standalone digital processing devices or can be embedded in another device. Such devices or methods can use a digital processing engine to carry out functions. The digital processing devices preferably have processing capability such as provided by one or more microprocessors, FPGA's, or a central processing unit (CPU) and/or a Graphics Processing Unit (GPU), which are adapted to carry out the respective functions by being programmed with software, i.e. one or more computer programs. References to software can encompass any type of programs in any language executable directly or indirectly by a processor, such as image processor 53 either via a compiled or interpretative language such as Java. The implementation of any of the methods of the present invention can be performed by or assisted by logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar.

Such devices e.g. image processor 53, may have memory (such as non-volatile memory, non-transitory computer readable medium, RAM and/or ROM), an operating system, optionally a display such as a fixed format display, ports for data entry devices such as a keyboard, a pointer device such as a "mouse", serial or parallel ports to communicate other devices, network cards and connections to connect to any of the networks. The software can be embodied in a computer program product adapted to carry out the functions itemised below when the software is loaded onto the image processor 53 or the controller and executed on one or more processing engines such as microprocessors, ASIC's, FPGA's etc. devices for use with any of the embodiments of the present invention can incorporate a computer system capable of running one or more computer applications in the form of computer software.

When the software is loaded onto the respective device or devices such as image processor 53 and executed on one or more processing engines such as microprocessors, ASIC's, FPGA's methods of embodiments of the present invention can be performed by one or more computer programs running on an electronic device such as image processor 53 by being loaded into a memory and run on or in association with an operating system such as Windows™ supplied by Microsoft Corp, USA, Linux, Android or similar. The electronic device image processor 53 can include a main memory, preferably random access memory (RAM), and may also include a non-transitory hard disk drive and/or a removable non-transitory memory, and/or a non-transitory solid state memory. Non-transitory removable memory can be an optical disk such as a compact disc (CD-ROM or DVD-ROM), a magnetic tape, which is read by and written to by a suitable reader. The removable non-transitory memory can be a computer readable medium having stored therein computer software and/or data. The non-volatile storage memory can be used to store persistent information that should not be lost if the computer system is powered down. The application programs may use and store information in the non-volatile memory.

Embodiments of the present invention involving software can work with a solid state light source arranged into at least one type 1 group and zero or one or more type 2 light source groups, the light source groups emitting light within wavelength bands wherein the wavelength bands of the type 2 light source group is larger than any light source group of type 1.

When the software is loaded onto the respective device or devices and executed on one or more processing engines such as microprocessors, ASIC's, FPGA's the following functions are carried out:

estimating an exposure time for an imaging device, an image sensor having digital sensor values adopting a saturation level.

When the software is loaded onto the respective device or devices and executed on one or more processing engines such as microprocessors, ASIC's, FPGA's the following functions are carried out:

receiving the digital sensor values, e.g. at an image processor.

When the software is loaded onto the respective device or devices and executed on one or more processing engines such as microprocessors, ASIC's, FPGA's the following functions are carried out:

for each of the type 1 light source groups
illuminating an object during an initial exposure time
the image sensor capturing an image of the object and mapping the image onto the digital sensor values.
the image processor being adapted to store the digital sensor values and for extracting the 98 or 95-98 percentile of a predetermined saturation level, (alternatively any of 75, 85, 95, 98, 99, 99.5, 100 percentiles can be used)
the image processor being adapted to calculate the exposure time by multiplying the initial exposure time with a constant and with the predetermined saturation level of the image sensor divided by the measured 98 or 95-98 percentile saturation level (alternatively any of 75, 85, 95, 98, 99, 99.5, 100 percentiles can be used)
and for each of the type 2 light source groups, if any, estimate the exposure time by using the exposure time of a type 1 group.

When the software is loaded onto the respective device or devices and executed on one or more processing engines such as microprocessors, ASIC's, FPGA's the following functions are carried out:

for each type 2 light source group setting the constant to 95-98 percentile saturation level of a type 1 light source group and dividing it by the corresponding exposure time of the type 1 light source group. Alternatively, any of 75, 85, 95, 98, 99, 99.5, 100 percentiles can be used;
further dividing by the 95-98 percentile saturation level of the type 2 light source group divided by the corresponding exposure time for the type 2 light source group. Alternatively, any of 75, 85, 95, 98, 99, 99.5, 100 percentiles can be used.

When the software is loaded onto the respective device or devices and executed on one or more processing engines such as microprocessors, ASIC's, FPGA's the following functions are carried out:

when the image sensor has an off-set current decreasing the saturation levels with a value corresponding to the off-set current;
multiplying the exposure times with an object depending weight factor between 0 and 1;
setting the predetermined saturation level to the highest linear saturation level of the image sensor;
setting the predetermined saturation level to any value between 60-80 percent;
the image processor being adapted to arrange the digital sensor values in a histogram.

The image processor may be part of a controller which can be embedded, stand alone or separate.

Any of the software described above can be compiled for a particular processor such as image processor 53. The software can be in the form of a computer program product which is stored on a non-transitory memory such as a removable memory of which an optical disk, e.g. compact disc (CD-ROM or DVD-ROM), a magnetic tape, is an example, or it can be a magnetic tape, a hard disc or a flash memory or similar.

5. Further Embodiments

It is possible to increase the number of parameters used with embodiments of the present invention in order to obtain higher accuracy of the estimated exposure time. In any or all of the embodiments of the present invention exposures can be defined by one or more exposure parameters of which exposure times are one example.

5.1. Introduction

An objective of these embodiments can be to perform well exposed image captures of one or more multi-spectral images of the same object. The object can be a biological tissue such as skin of a human or animal. It can be assumed that the object doesn't move during the capture sequence, or only to such extent that the focus and exposure is not impacted significantly. These embodiments of the present invention can obtain this in four phases: (1) focus phase, (2) exposure metering phase, (3) exposure estimation phase and (4) acquisition phase. Metering is the process a camera or an image sensor uses to adapt the exposure such as adapting one or more exposure parameters of which exposure time is one example.

5.2. Focus Phase

While imaging an object (e.g. biological tissue such as human or animal skin) by the image sensor in a live video preview, the object can be illuminated using (un)polarized (i.e. polarized or unpolarized) white LED illumination. The device can during this phase perform continuous auto-focus. Alternatively there can also be a manual focus mode, for example for cases where the non-contact cone is used in combination with skin with hairs. The result can be a focus setting Focus [White (un)polarized] where the object of interest is well focused. The device can also have calibration data for each light type with the relationship between a focus setting and object distance. Based on the focus setting Focus[White (un)polarized] using (un)polarized white LED illumination combined with the corresponding calibration data the object distance can be calculated. Next based on the object distance combined with the focus calibration data for each of the multispectral light types, the focus setting Focus[i] for each of these multispectral light types can be calculated. These focus settings can be used in the next phases.

5.3. Exposure Metering Phase

During the metering phase, one or more still images can be acquired for one or more of the light types, using e.g. focus settings determined during the focus phase, or known exposure settings (illumination LED current, sensor analog gain, sensor digital gain, sensor exposure time T[exp,initial, i]).

5.4. Exposure Estimation Phase

During the exposure estimation phase, the exposure settings T[exp,i] which is used for the acquisitions during the acquisition phase, can be estimated. This step corresponds to step 12 in FIG. 1 or FIG. 2 step 22 and 23, and corresponding text.

Throughout the different implementations, some metrics can be extracted which provide information on how the most exposed pixels behave. It's desired to avoid that too many pixels are clipped against the maximum possible sensor value (fully saturated pixels). As described above, most sensors behave non linearly for values near the upper limit of the sensor range. Therefore we also want to avoid that too many pixels have pixel values within this non-linear sensor range.

For acquisition of multispectral dermoscopic images, a Sony IMX274 sensor can be used. It is possible to experimentally define that 'well exposed' images can be obtained when the 98 percentile of the most exposed color channel is located at 60% of the sensor range (the exposure target PCT[target]=0.6). Alternatively any of 75, 85, 95, 98, 99, 99.5, 100 percentiles can be used. Other sensors and/or other object types could have other metrics and/or target values determining a 'well exposed' image. Alternatively, instead of avoiding having too many pixels with pixel values in the non-linear sensor range, it's also possible to compensate for these sensor non-linearities. The compensation can be implemented by e.g. extrapolating to additional linear pixel values and map the sensor values to these extrapolated values. Depending on the sensor and object type, this may result in a higher suitable exposure target PCT[target] resulting in a better signal to noise ratio. Care must however be taken that this higher exposure target doesn't result in too many fully saturated pixels.

5.5. Acquisition Phase

During the acquisition phase for each of the light types 'i', a still image can be acquired using the previously determined focus setting Focus[i] and exposure setting T[exp,i]. This corresponds to step 13 in FIG. 1 and corresponding text.

Variations on this embodiment also belong to the present invention and these mainly vary on the following topics:

Defining for which light types a still image acquisition is needed during the exposure metering phase, or How to estimate the exposure settings T[exp,i] to be used during the acquisition phase for the different light types.

Figure 6:
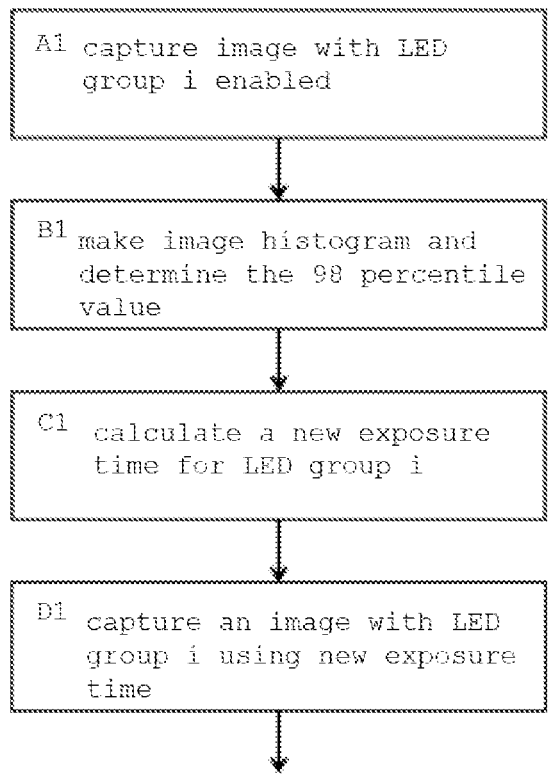
FIG. 6 shows a flow chart comprising light type metering according to an embodiment of the present invention.

6. Fifth Embodiment—Per Light Type Metering 6.1 FIG. 6 shows a flow chart of the fifth embodiment: Per light type metering.

For every solid state light source such as LED group i, perform the following steps:

A1: Capture image with LED group i enabled (predetermined LED current, sensor exposure time, sensor analog gain, sensor digital gain for group i). The output of the step is an image.

B1: Make an image histogram and determine the 98 percentile value

The output to next step is the percentile value+initial exposure tie+sensor black offset.

C1: Calculate a new exposure time (or value) for LED group i, given the 98 percentile value, initial exposure time (or value) and sensor black offset. The output of the step is the new exposure time (or value).

D1: Capture an image with LED group i enabled (same LED current for group i as before, use the new exposure time for group i). The output of the step is the image for LED group i with improved exposure.

6.2. Each step is now further detailed.

6.2.1. Exposure metering phase—step A1:

During the metering phase one still image can be acquired for each of the light types (both white and multispectral, both polarized and unpolarized).

These still images can be acquired using:

Focus settings determined during the focus phase

Known initial exposure settings (illumination LED current, sensor analog gain, sensor digital gain, sensor exposure time T[exp,initial,i])

These initial exposure settings can be based on calibration data per device. These are chosen so that for example, if the object to be illuminated was a Spectralon 99% diffuse reflector, each of the still images (different light types) would be exposed so that the 98 percentile of the most saturated sensor color channel would be near 80% of the sensor range. If we image e.g. human or animal skin, the diffuse reflection will be significantly less then 99% and therefore the sensor will not be saturated and most of the pixel values will be inside the sensor linear range. This initial exposure setting can assure that the still images are not too dark, providing adequate signal to noise ratio to estimate proper exposure settings to be used during the acquisition phase.

6.2.2. Exposure Estimation Phase—Steps B1 and C1:

From each of the still images acquired in step A1, corresponding to light type 'i', the following parameters can be extracted:

Sensor black offset: black[i]

This can be expressed as normalized sensor value and can be retrieved from a dedicated region of the sensor which is mechanically blocked from any illumination.

For sensors which wouldn't have such an optical black zone, this black offset could be estimated or calibrated.

Observed exposure percentile position PCT[i]

This corresponds to the normalized sensor pixel value of the 98 percentile position of the most saturated color channel.

Next for each of the light types 'i' the improved sensor exposure time T[exp,i] is estimated so that the 98 percentile position of the most saturated color channel would be positioned around PCT[target,i] using:

$$T[exp,i]=T[exp,initial,i]\times(PCT[target,i]-Black[i])/(PCT[i]-Black[i]) \quad (6)$$

The index "target" for a light type i corresponds to "maxsat" in equations (1), (2), (3) and (5)).

Instead of varying the sensor exposure time, it is possible to vary the exposure settings such as illumination solid state light source such as LED current, the sensor analog gain or the sensor digital gain, to obtain an improved exposure. Optionally non-linear behavior of these features can be taken into account.

6.2.3. Acquisition phase—step D1:

During the acquisition phase for each of the light types 'i', a still image is acquired using the previously determined focus setting Focus[i] and exposure settings T[exp,i]0.7. Estimating exposure settings for multispectral images from white light (or light with wide spectral band) image.

7 Estimating Exposure Settings for Multispectral Images from White Light Image 7.1. Introduction The above embodiments comprise that for each image to be finally acquired during the 'Acquisition phase' a corresponding image needs to be acquired during the 'Exposure metering phase'. It can be desired to reduce the amount of still images that needs to be acquired in order to increase speed. This embodiment corresponds to FIG. 4 and corresponding text.

7.2. Reducing the total number of still images acquired during the capture sequence. This can be obtained by estimating T[exp,i] for (a subset- or all of) the multispectral images (which are narrow spectral band images) based on a set of parameters extracted from e.g. the White polarized image (which is a wide spectral band image). Therefore removing the need to acquire multispectral images during the metering phase (or at least reducing the number of light types for which a separate metering still image is needed).

The table in FIG. 7 shows an example indicating which still image is used for each light type to estimate the exposure time T[exp,i].This can reduce the total number of still images from 11×2=22 to 3×2+8=14, in the example of FIG. 7.

Note that the cross polarized illumination types will block out specular reflections (e.g. allowing to see through the top layer of the skin). This also means that the White polarized illumination type doesn't have any information related to these specular reflections. Estimating exposure acquisition settings for unpolarized illumination types based on the White polarized illumination type may therefore not be very accurate.

The exposure acquisition settings for the unpolarized illumination types can therefore be made by using steps A1 to D1 in FIG. 6 of 'Approach 1—Per light type metering'.

7.3. Eighth Embodiment—Estimate Exposure Settings Based on White Light R, G and B 98 Percentile Positions.

7.3.1. Introduction

The following light types still use the embodiment—Per light type metering':

White polarized
White unpolarized
Blue unpolarized

After images for these light types are acquired there is a well exposed 'White polarized' still image available.

'White polarized' still image can be used to estimate the exposure settings for the remaining light types.

Figure 8:
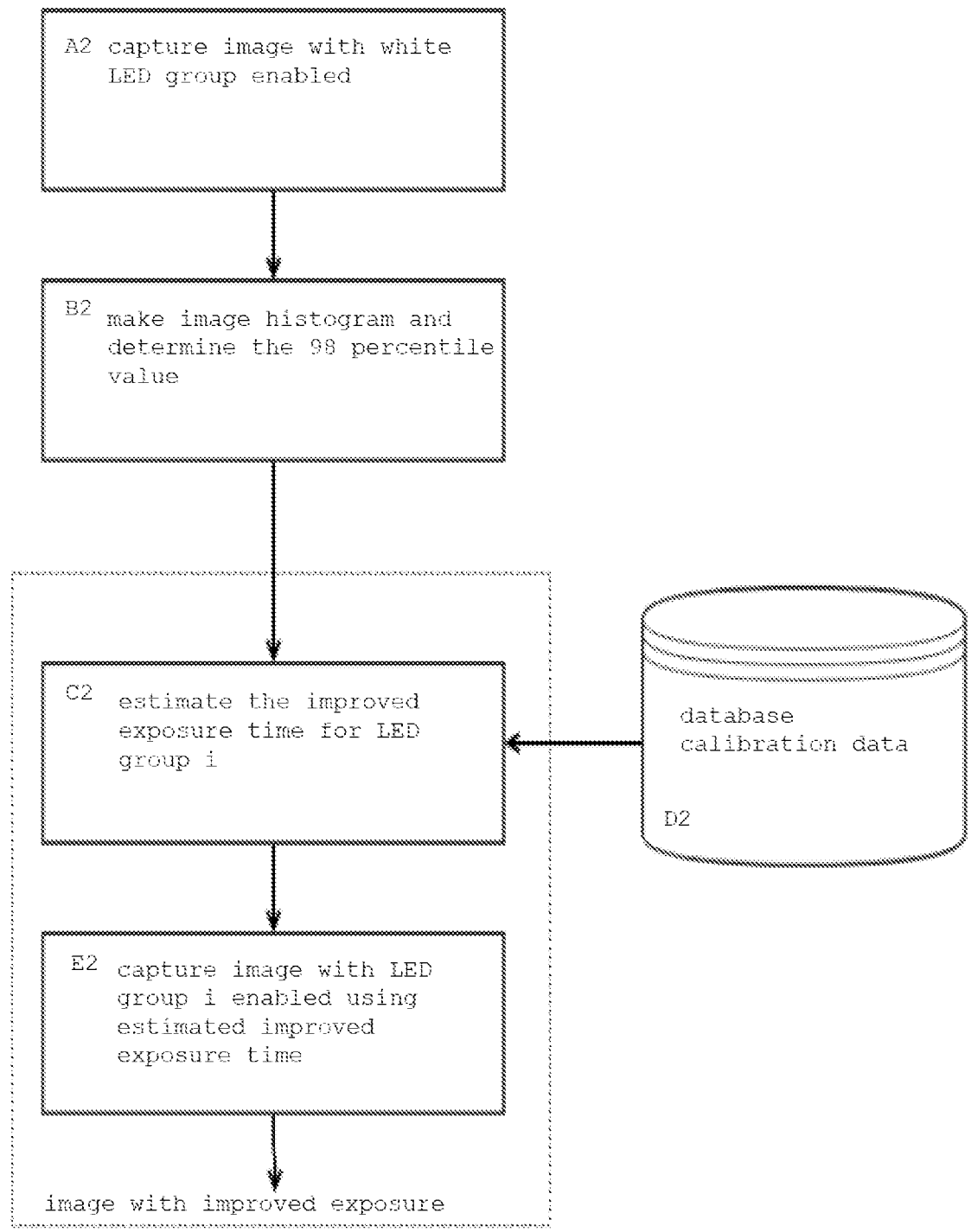
FIG. 8 shows a flow chart comprising estimation based on white light and R, G and B percentile positions according to an embodiment of the present invention.

7.3.2. FIG. 8 shows a flow chart of the eighth embodiment: Estimate exposure settings based on white light R, G and B 98 percentile positions, comprising the following steps:

A2: Capture an image with the white LED group enabled (predetermined LED current, sensor exposure time, sensor analog gain, sensor digital gain). The output of the step is an image.

B2: Make an image histogram and determine the 98 percentile value for R, G, and B channels. The output of the step is the R, G, and B percentile values.

C2: Estimate the improved exposure time (or value) for LED group i. The output of the step is the estimated exposure time (or value)

D2: The calibration data obtained for all LED groups using a white reflective target is input to step C.

E2: Capture image with LED group i enabled, using the estimated improved exposure time for LED group i. The output of the step is the image for LED group i with improved exposure.

The steps C2, D2, E2 are performed for every LED group i.

7.3.3. Each step is now further detailed.

7.3.3.1. Exposure metering phase—step A2:

In this embodiment the exposure metering phase is done based on a single well exposed still image illuminated using white (polarized) LED group (which is a wide spectral band illumination).

The exposure settings to acquire this 'well exposed' white image can be obtained using steps A1 to D1 in FIG. 6 of the embodiment—Per light type metering'.

7.3.3.2. Exposure estimation phase—steps B2, C2 and D2:

In a calibration phase well exposed images can be acquired e.g. of a Spectralon diffuse reflector (99%) for each illumination type 'i'. The white illumination light type (which is a wide spectral band illumination) is below referred to as 'wide'. From these images the observed 98% percentile positions PCT[reflector,wide] and PCT[reflector,i] can be extracted together with the corresponding black offset values Black[reflector,wide] and Black[reflector,i]. Additionally from the corresponding acquisition settings the used exposure times T[exp,reflector,wide] and T[exp,reflector,i] can be extracted. For each of these illumination types 'i' the following factor C, (a.k.a. C[group]) is defined and stored per device:

$$C[i]=((PCT[reflector,wide]-Black[reflector,wide])/T[exp,reflector,wide])/((PCT[reflector,i]-Black[reflector,i])/T[exp,reflector,i]) \quad (7)$$

Note: the nominator in this equation corresponds to the slope of the exposure model (FIG. 11) with wide spectral band illumination (e.g. white polarized LED group). The denominator corresponds to the slope of the exposure model (FIG. 11) with the multispectral illumination.

When acquiring images of the target object (e.g. skin), we first acquire a well exposed still image using the white polarized LED group.

From this still image the observed 98% percentile value PCT[wide] and black offset Black[wide] is extracted, together with the exposure time T[exp,wide] used to acquire this image. Next the exposure time for illumination type 'i' (T[exp,i] which corresponds to T[exp,group] in equation (3)) to obtain an exposure target of PCT[target,i] is estimated using:

$$T[exp,i]=C[i]\times T[exp,wide]\times (PCT[target,i]-Black[wide])/(PCT[wide]-Black[wide]) \quad (8)$$

So, here we first calculate the improved exposure time to have the image exposed at exposure target position PCT[target], as if we will be using white illumination. And next we transform this from the white illumination domain to the multispectral illumination domain 'i' using the factor C[i].

7.3.3.3. Acquisition Phase—Step E2:

The step D1 in FIG. 6 of embodiment—Per light type metering' is here incorporated.

8. Ninth Embodiment 3—Estimate Exposure Settings Based on More Parameters

81. Introduction

The main difference compared to the previous embodiment is that additional information from the white light image can be extracted. This information can be used as the input for a more complex model. The goal of this approach is to more accurately estimate the improved exposure times used during the Acquisition phase.

Figure 9:
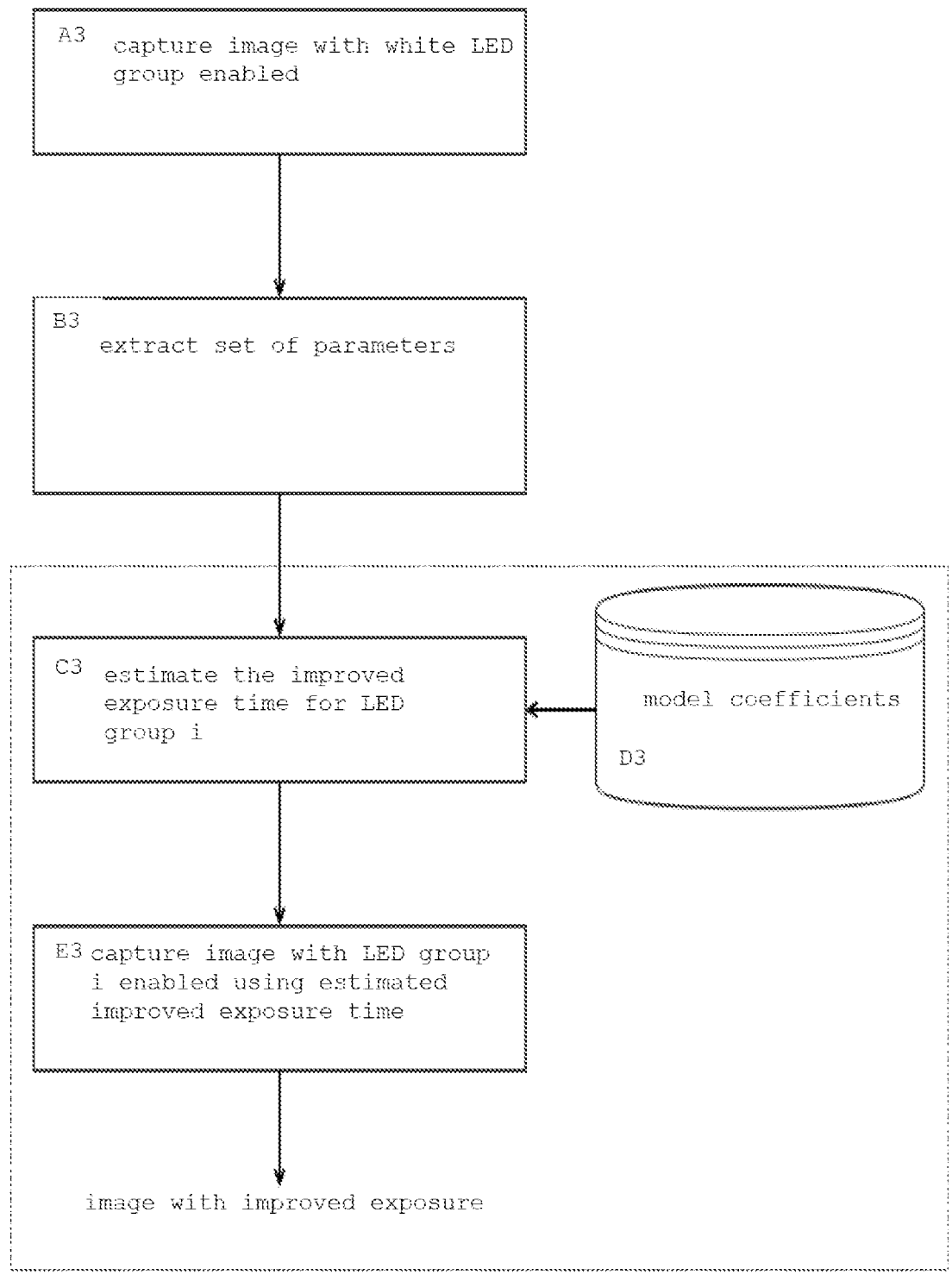
FIG. 9 shows a flow chart comprising estimation based on additional parameters according to an embodiment of the present invention.

8.2. FIG. 9 shows a flow chart of the eighth embodiment—Estimate exposure settings based on more parameters, comprising the following steps:

A3: Capture an image with white LED group enabled (predetermined LED current, sensor exposure time, sensor analog gain, sensor digital gain). The output of the step is the image.

B3: Extract the following parameters: For R, G and B color channels:

Percentile positions 75, 85, 95, 98, 99, 99.5, 100%
Slope at percentile positions (first derivative)
Number of saturated pixels (>99.x %)

The output of the step is the set of extracted parameters.

C3: Estimate the improved exposure time for LED group i. The output of the step is the estimated exposure time.

D3: The model coefficients is input to step C3.

E3: Capture an image with LED group i enabled, with estimated improved exposure time for group i. The output of the step is the image for LED group i with improved exposure.

8.3. Each step is now further detailed.

8.3.1. Exposure metering phase—step A3:

Step A2 of FIG. 8 in embodiment—Estimate exposure settings based on white light R, G and B 98 percentile positions is here incorporated.

8.3.2. Exposure estimation phase—steps B3, C3 and D3:

In step B3 a number of parameters from the white light still image can be extracted. As before mentioned, in order to have a 'well exposed' image it is important to characterize how the most exposed pixels in the image behave.

In the previous embodiments the behavior of the most exposed pixels is modeled by extracting the 98 percentile positions of both the R, G and B color channels. This may however provide limited information. For example: if the histogram tail is long, then the risk that too many pixels having a value above the 98 percentile position are fully saturated or are inside the non-linear sensor range is higher compared to a steep/short histogram tail.

Hence, in order to have a better characterization of the behavior of the most exposed pixels (the histogram tail of the most exposed color channel) a second percentile position could be added, or the first derivative at the 98 percentile position could be added. It's also possible to add information of how many pixels are fully saturated or nearly saturated (e.g. a value >99.x % of the sensor range).

One embodiment of the present invention comprises a model which uses 7 percentile positions (75, 85, 95, 98, 99, 99.5, 100) per color channel, adding up to a total of 21 model input parameters.

In step C3 a fully connected neural network can be used as model to perform the estimations. Alternative model architectures, or even other equivalent machine learning methods may be used as well. Experiments resulted in adequate model performance by using a fully connected neural network to perform this regression task with a single hidden layer with 64 nodes (+bias) and ReLU as activation functions, followed by a fully connected layer+bias to obtain the model output. An example algorithm of how the coefficients to be used in this model (step D3) is explained below in the next approach in section 'Documentation—Example of algorithm to determine model coefficients'.

8.4. Acquisition phase—step E3:

The step D1 in FIG. 6 of embodiment—Per light type metering' is here incorporated.

8.4. tenth embodiment—Exposure estimation model based on models of an "reference device" and an "actual device".

8.4.1. Introduction

A device which can be used to perform the actual capture sequence of the object of interest (e.g. skin) can be modelled- and referred to as a "actual device". An "reference device" is a model of another device where the model differs from that of a "actual device". The difference can comprises that non-ideal effects of a "actual device", such as variability in optical efficiency of the illumination LED's, can be compensated for. The exposure estimation model input parameters can first be generalized to such an "reference device", and the exposure time is estimated, and the estimation can then be generalized to a "actual device".

Figure 10:
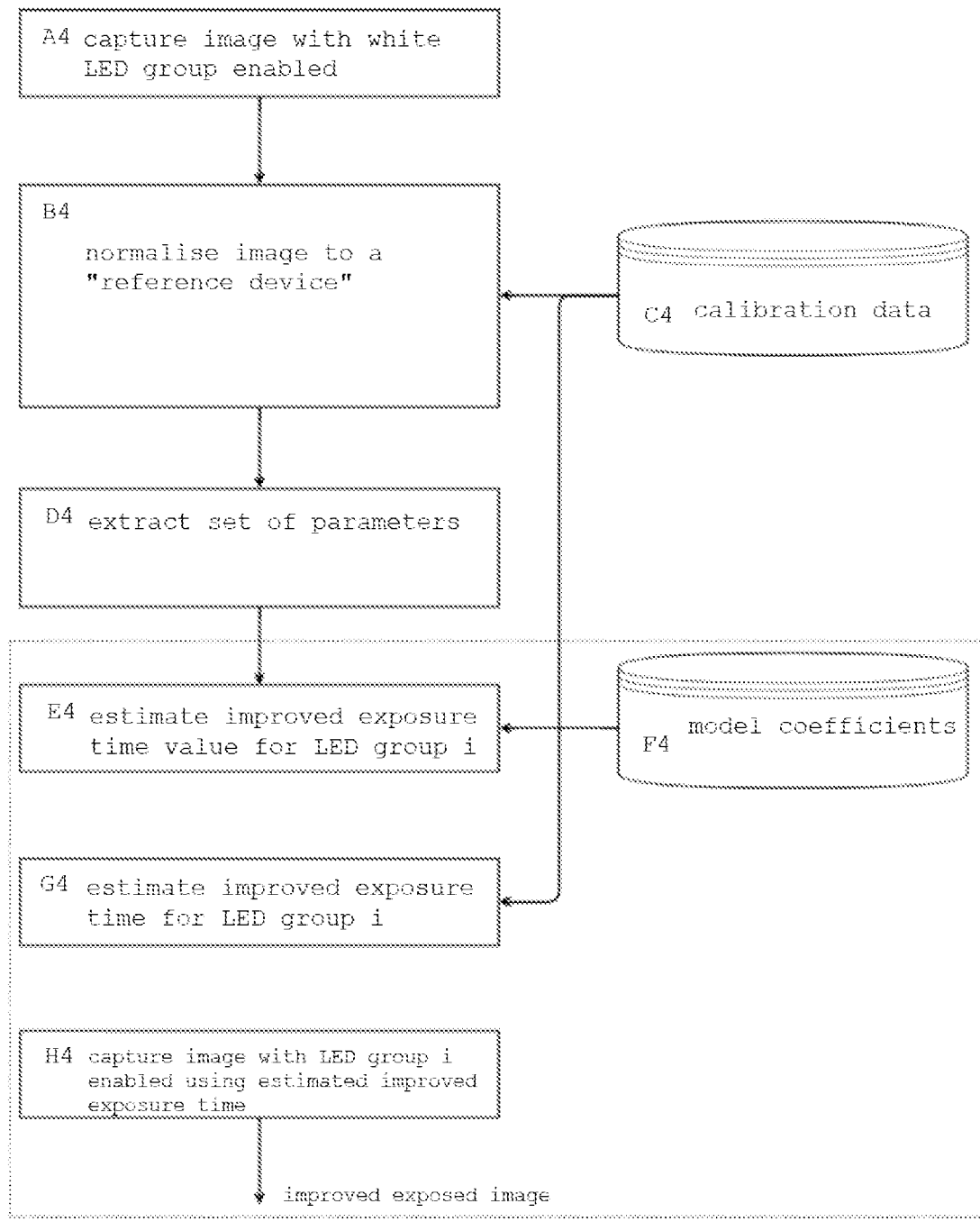
FIG. 10 shows a flow chart comprising estimation based on a "reference device" according to an embodiment of the present invention.".

8.4.2. FIG. 10 shows a flow chart of the embodiment—Exposure estimation model based on "reference device", comprising the following steps:

A4: Capture an image with white LED group enabled (predetermined LED current, sensor exposure time, sensor analog gain, sensor digital gain). The output of the step is the image.

B4: Normalize the image to a "reference device" by compensating for any- or a multiple of:
sensor black offset
sensor optical sensitivity
sensor non-linearity
sensor non-uniformity
exposure settings
(illumination LED current, sensor exposure time, sensor analog gain, sensor digital gain)
illumination optical efficiency
illumination non-uniformity
temperature
. . . .

The output of the step is the normalized image.

C4: Calibration data for the "actual device" is provided for all LED groups using diffuse reflector calibration targets as input to step B4 and G4. (For example, a Spectralon 20% or a Spectralon 99% calibration target can be used, depending on the measurement to be performed.)

D4: Extract parameters:
For R, G and B color channels:
Percentile positions 75, 85, 95, 98, 99, 99.5, 100%,
Slope at percentile positions (first derivative)
Number of saturated pixels (>99.x %)
The output of the step is the set of extracted parameters.

E4: Estimate the improved exposure time value for LED group i for "ideal device". The output of the step is the improved exposure value for the "reference device"

F4: The model coefficients for the "reference device" is input to step E.

G4: Estimate the improved exposure time for LED group i for the "actual device". The output of the step is the exposure value for the "actual device".

H4: Capture an image with the LED group i enabled, using the estimated improved exposure time for group i. The output of the step is the improved exposed image for LED group i.

Perform steps E4, F4, G4, H4, for every LED group i.

8.4.3. Each step is now further detailed.

The step A3, B3, C3 and H3 in FIG. 9 of 'Approach 3—Estimate exposure settings based on more parameters, is here incorporated in the steps A4, D4, E4 and H4, respectively. There are also two additional steps B4 and G4, combined with an additional device calibration data C4.

A benefit of this approach is that the model parameters can be determined based on images acquired by a device with known parameters, referred to as a "reference device". The estimation of the exposure e.g. defined by one or more exposure parameters such as the exposure time (or other exposure parameter) can then be made on this reference device and later on generalized to an "actual device" using the additional device calibration data.

8.4.4. Normalize image/parameters to an "reference device"—steps B4, C4 and D4

Note that, depending on which effect(s) it's desired to compensate for, the order of steps B4 and D4 could be swapped. As an example: mathematically it's possible to swap the black offset compensation between these two steps. However compensation of for example illumination non-uniformity needs to be done on the image itself.

Some experiments were performed where the percentile positions were normalized instead of the image (for calculation performance, the selected steps can be done in an mathematical equivalent way on the image as well). For light type 'i' and percentile positions 'j' (PCT[i, j]) we can calculate the normalized percentile positions PCT'[i, j] by compensating for the black offset Black[i] and the initial exposure time T[exp,initial,i] using:

$$PCT'[i,i]=(PCT[i,i]-Black[i])/T[exp,initial,i] \quad (9)$$

We can additionally compensate for the total optical efficiency of the system (combination of illumination optical power, illumination spectral signature, sensor sensitivity, polarizer efficiency, . . . ). This can be done by using additional calibration data, which, for each light type, models an 'exposure value' as a function of 'exposure time'. This 'exposure value' can for example be defined as the black offset compensated mean value across the center 500×500 pixels of the sensor field of view (FOV) when imaging a Spectral 20% diffuse reflector.

$$PCT''[i,i]=(PCT[i,i]-Black[i])/(f[cal,i](T[exp,initial,i]))=(PCT[i,i]-Black[i])/exposure\_value[i] \quad (10)$$

Figure 11:
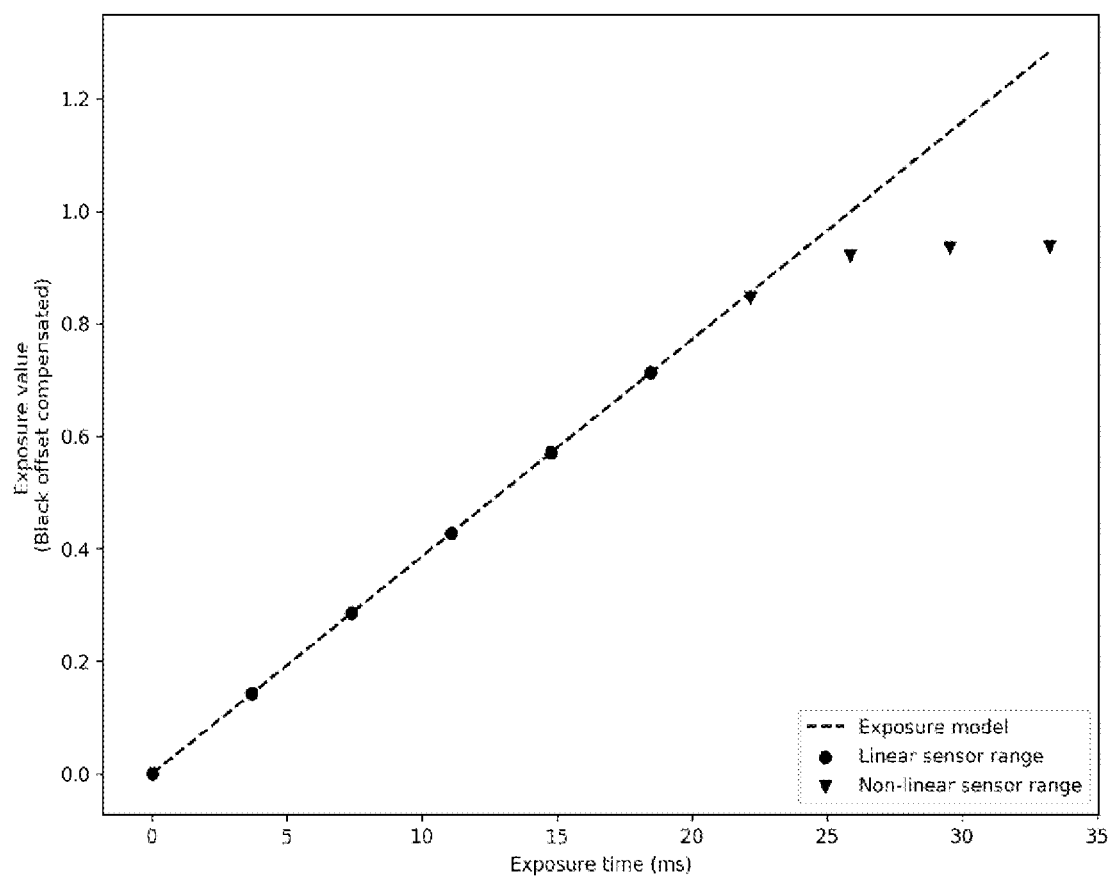
FIG. 11 shows the exposure values corresponding to different exposure time values when imaging a diffuse reflector calibration target according to an embodiment of the present invention.

An example of such a calibration data function f[cal,i] for a given light type 'i' is shown in this figure as the dotted line:

FIG. 11 shows the exposure values corresponding to different exposure time values when imaging a diffuse reflector calibration target. An exposure value is the averaged pixel value in a region of interest of the image (possibly from the most exposed color channel).

Note that in FIG. 11, the definition of 'saturated' is used to indicate pixel values above a given threshold (80% of the sensor range), these are actually not really fully saturated pixels (i.e. clipped to the maximum sensor value), but rather pixel values which are in the non-linear sensor range.

8.5. Generalize estimated "exposure value" for the "reference device" to an "exposure time" for "this device"

This can be done by applying the inverse of the calibration function (f[cal,i])^(−1) onto the model output, being an "exposure value" and obtaining the corresponding "exposure time".

$$T[exp,i]=(f[cal,i])^{(-1)}(exposure,value[i]) \quad (11)$$

Figure 12:
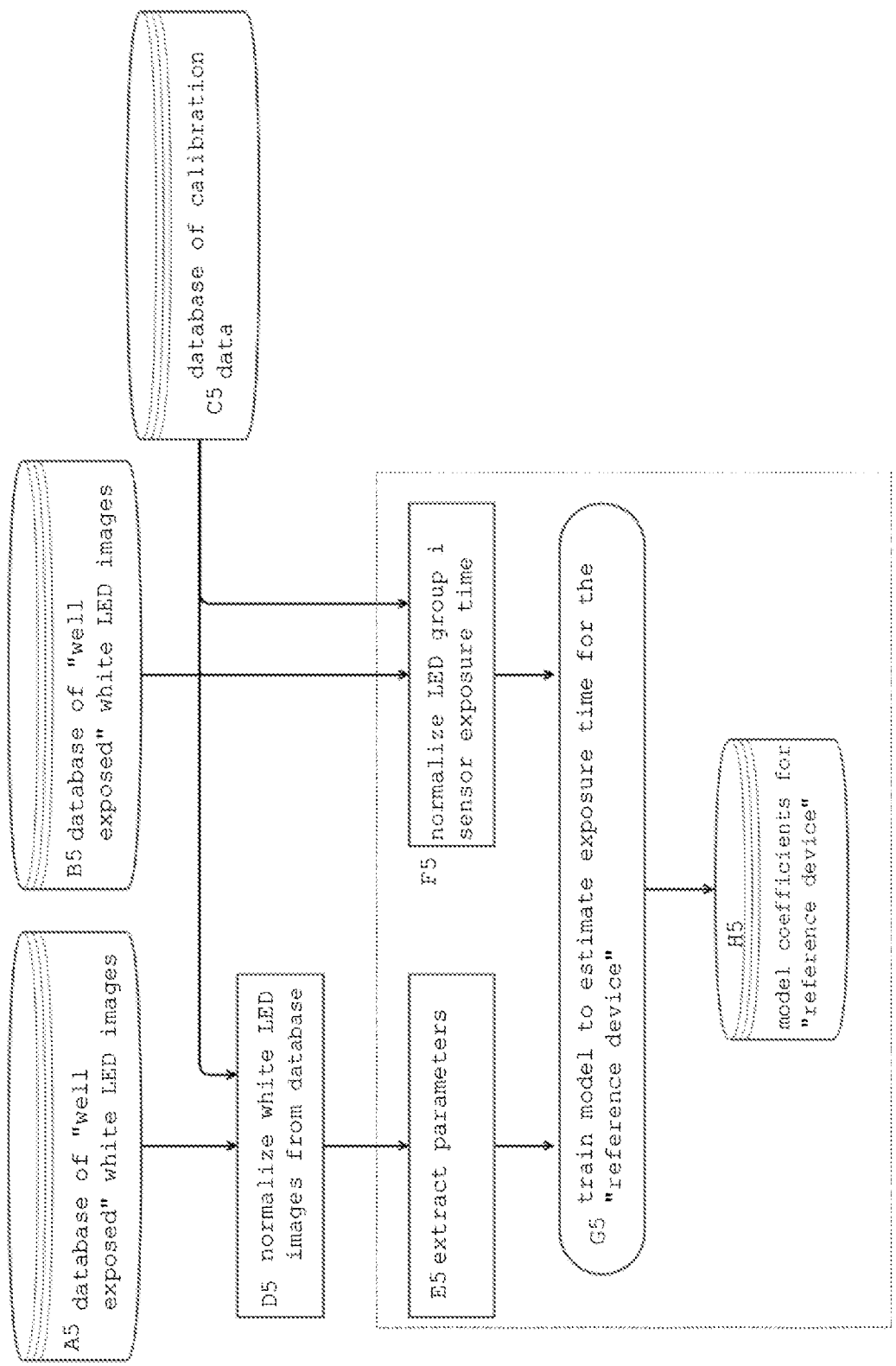
FIG. 12 shows a flow chart comprising a method for determining the 'model coefficients' or device calibration data according to an embodiment of the present invention.

8.5.1. FIG. 12 shows a flow chart of an Example of a method for determining the 'model coefficients'.

A5 is a Database of "well exposed" white LED (skin lesion) images acquired with one or more different devices with acquisition settings meta-data
(LED current, sensor exposure time, analog gain, digital gain)
and device identifier (serial number)
B5 is a Database of "well exposed" LED group (skin lesion) images
acquired with one or more different devices
with acquisition settings meta-data
(LED current, sensor exposure time, analog gain, digital gain)
and device identifier (serial number)
C5 is a Database with calibration data for each of the devices used to acquire the dataset of (skin lesion) images
obtained for all LED groups using
diffuse reflector calibration targets
(Spectralon 20% and Spectralon 99%)
Step D5: Normalize white LED (skin lesion) images database to a "reference device". The output of the step is the normalized image.
Step E5: Extract parameters.". The output of the step is the set of model output parameters.
Step F5: Normalize the LED group i sensor exposure time to a "reference device". The output of the step is the exposure value for an "ideal exposure target" for the "reference device".
Step G5: Train the model to estimate exposure time for the "reference device". The output of the step is the trained model.
Step H5: Model the coefficients for the "reference device".
Perform steps E5, F5, G5, H5 For every LED group i.
3.5.5. Each step is now further detailed.
3.5.5.1. Database with white LED and multispectral images—A5 and B5
In one embodiment of the present invention there can be a large database (>1000 skin lesions) acquired using multiple devices (4). For each of these database elements we have the following data:
Database A5:
Well exposed white polarized image combined with the corresponding acquisition settings;
Well exposed white unpolarized image combined with the corresponding acquisition settings;
Serial number of the device used to acquire these images.
Database B5:
For each multispectral light type 'i':
Well exposed image acquired using illumination of light type 'i'
Corresponding acquisition settings
Serial number of the device used to acquire these images.
With acquisition settings we refer to setting as: focus setting, illumination LED current, sensor exposure time, sensor analog gain, sensor digital gain, sensor black offset . . . .
The object imaged in both databases is the same (skin lesion) object. Limited motion between the different images in both databases may be expected/allowed, but when motion is excessive, these could be excluded from the database as a kind of data cleaning step.
8.5.2. Database with per-device calibration data—C5
This database C5 contains per-device calibration data for each of the devices used to acquire the data in databases A5 and B5. The link between both databases in established based on the device serial number.
8.5.3. Normalize image/parameters to "reference device"—steps C5, D5 and E5. This step incorporates, mutatis mutandis, the steps B4, C4 and D4 in approach 4 above.
8.5.4. Normalize sensor exposure time—step F5
For each of the well exposed images of light type 'i' in database (B5) we extract the exposure time (T[exp,i]), black offset (Black[i]) and observed exposure (as 98 percentile position PCT[i]). This observed exposure will be very close to the improved exposure target PCT[target], but it may slightly deviate. Therefore we calculate the exposure time for a more exact match of the improved exposure target:

$$T[exp,i]=T'[exp,i]\times(PCT[target]-Black[i])/(PCT[i]-Black[i]) \quad (12)$$

Next we transform this 'ideal exposure time' for "this device" (the one used to acquire these images) to an ideal exposure value for the "reference device".

$$exposure\_value[i]=f[cal,i](T[exp,i]) \quad (13)$$

8.5.5. Train model to estimate exposure time for reference device—step G5
The previous steps have resulted in 'model input parameters' from steps C5, D5 and E5, and 'model output labels' or the exposure value for an "ideal exposure target" for the "reference device", from step F5.
For each multispectral illumination type 'i' a dedicated model is trained based on this data. An example of such a model estimates the improved exposure value for the Cyan polarized illumination type based on parameters extracted (and normalized) from a well exposed image using the white polarized illumination type.

The training of the model coefficients can be implemented as solving a machine learning linear regression problem. One of the possible models to be used here is a fully connected neural network. Alternate model architectures may be used as well. Experiments resulted in adequate model performance by using a fully connected neural network to perform this regression task with a single hidden layer with 64 nodes (+bias) and ReLU as activation functions, followed by a fully connected layer+bias to obtain the model output. Standard machine learning optimization techniques (such as weight regularization, proper loss function selection, hyper parameter tuning, dropout, train/eval/test dataset split . . . ) can be used during training of this model.

8.5.6. Extract model coefficients—step H5

Once the different models for the different multispectral light types are trained the resulting coefficients are exported and saved to a database H5.

These model coefficients, together with the model architecture (number of layers, nodes per layer, activation functions, . . . ) can later on be imported by the device to perform the corresponding estimations on-device.

8.5.7. Remarks

Other options are included within the scope of the present invention:

For example 'Blue unpolarized' exposure can be predicted from the 'White unpolarized' still capture, and this would remove the need of acquiring the 'Blue unpolarized' still image during the exposure metering phase, further reducing the total capture sequence time.

Preferably, the capture sequence has a predictable order in which the different images are acquired. As an example: in the acquisition phase T[exp,Green polarized] is normally predicted based on the White polarized still image in the exposure metering phase. However T[exp,Green polarized] can be predicted (in the acquisition phase) based on any (combination of) the earlier images already acquired (for example based on Cyan polarized). A combination of multiple already acquired images (for example based on White polarized and Cyan polarized) can be used.

The advantage of embodiments including training the exposure estimation model is that it doesn't only rely on device calibration data, but also on a database of skin images (e.g. white light+multi-spectral).

A default set of model parameters can be determined for all devices, and these model parameters can be further fine tuned "in the field" based on the observed characteristics of the acquired images (e.g. dermatologist with mainly Caucasian people vs. dermatologist with a population of mainly Afro-Americans).

9. Implementation

The image processor 53 described above as well as other devices for use with embodiments of the present invention can be standalone digital processing devices or can be embedded in another device. Such devices or methods can use a digital processing engine to carry out functions. The digital processing devices preferably have processing capability such as provided by one or more microprocessors, FPGA's, or a central processing unit (CPU) and/or a Graphics Processing Unit (GPU), which are adapted to carry out the respective functions by being programmed with software, i.e. one or more computer programs. References to software can encompass any type of programs in any language executable directly or indirectly by a processor, such as image processor 53 either via a compiled or interpretative language such as Java. The implementation of any of the methods of the present invention can be performed by or assisted by logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar.

Such devices e.g. image processor 53, may have memory (such as non-volatile memory, non-transitory computer readable medium, RAM and/or ROM), an operating system, optionally a display such as a fixed format display, ports for data entry devices such as a keyboard, a pointer device such as a "mouse", serial or parallel ports to communicate other devices, network cards and connections to connect to any of the networks. The software can be embodied in a computer program product adapted to carry out the functions itemised below when the software is loaded onto the image processor 53 or the controller and executed on one or more processing engines such as microprocessors, ASIC's, FPGA's etc. devices for use with any of the embodiments of the present invention can incorporate a computer system capable of running one or more computer applications in the form of computer software.

When the software is loaded onto the respective device or devices such as image processor 53 and executed on one or more processing engines such as microprocessors, ASIC's, FPGA's methods of embodiments of the present invention can be performed by one or more computer programs running on an electronic device such as image processor 53 by being loaded into a memory and run on or in association with an operating system such as Windows™ supplied by Microsoft Corp, USA, Linux, Android or similar. The electronic device image processor 53 can include a main memory, preferably random access memory (RAM), and may also include a non-transitory hard disk drive and/or a removable non-transitory memory, and/or a non-transitory solid state memory. Non-transitory removable memory can be an optical disk such as a compact disc (CD-ROM or DVD-ROM), a magnetic tape, which is read by and written to by a suitable reader. The removable non-transitory memory can be a computer readable medium having stored therein computer software and/or data. The non-volatile storage memory can be used to store persistent information that should not be lost if the computer system is powered down. The application programs may use and store information in the non-volatile memory.

When the software is loaded onto the respective device or devices and executed on one or more processing engines such as microprocessors, ASIC's, FPGA's the following functions are carried out:

estimating an exposure parameter for imaging an object with an imaging device including a plurality of solid state light sources arranged into at least a first group and at least a second group, the light source groups emitting light within wavelength bands wherein the total coverage of all wavelength bands of the first light source group is at least as wide or wider as any wavelength band of the second light source group, and an image sensor having digital sensor values.

When the software is loaded onto the respective device or devices and executed on one or more processing engines such as microprocessors, ASIC's, FPGA's the following functions are carried out:

an image processor receiving the digital sensor values and carries out the method comprising the steps of
imaging the object with the first light source group with a first exposure parameter value the image sensor capturing an image of the object and mapping the image onto the digital sensor values
and the image processor estimating a second exposure parameter value for the second light source group from the digital sensor values,
and extracting at least one percentile of the digital sensor values,
and estimating
the second exposure parameter value as a function of the first exposure parameter value
and device calibration data
and a target saturation level of the image sensor
and a first black level,
and the measured digital sensor values of the first group,
and a second black level,
wherein the device calibration data comprises the relationship between the digital sensor values and the sensor exposure parameter value for a reference object.

When the software is loaded onto the respective device or devices and executed on one or more processing engines such as microprocessors, ASIC's, FPGA's the following functions are carried out:

extracting percentiles in the range 50 to 100 or 70 to 100 or 95 to 98 or 100;

estimating the exposure parameter value by using a multiple of percentiles;

including in the calibration data one or more of: sensor black offset, sensor optical sensitivity, sensor non-linearity, sensor non-uniformity, light source drive current, sensor exposure time, sensor analog gain, sensor digital gain, light source optical efficiency, light source non-uniformity or light source temperature;

estimating the exposure parameter value by using at least two first light source groups;

estimating the exposure parameter value by estimating any of: light source current, sensor exposure time, sensor analog gain, sensor digital gain, light source brightness, optical aperture.

Any of the software described above can be compiled for a particular processor such as image processor 53. The software can be in the form of a computer program product which is stored on a non-transitory memory such as a removable memory of which an optical disk, e.g. compact disc (CD-ROM or DVD-ROM), a magnetic tape, is an example, or it can be a magnetic tape, a hard disc or a flash memory or similar.

The invention claimed is:

1. A method for estimating an exposure parameter value for imaging an object with an imaging device comprising a plurality of solid state light sources arranged into at least one first group and at least one second group, the first and second light source groups emitting light within wavelength bands wherein the total coverage of all wavelength bands of the first light source group is at least as wide or wider than any wavelength band of the second light source group, an image sensor having digital sensor values adopting a level of saturation, an image processor receiving the digital sensor values and carrying out the method; the method comprising the steps of:
imaging the object with the at least one first light source group with a first exposure parameter value,
the image sensor capturing an image of the object, and mapping the image onto the digital sensor values,
and the image processor estimating a second exposure parameter value for the at least one second light source group from the digital sensor values,
and extracting at least one measured percentile value of the digital sensor values for a target saturation level,
and estimating the second exposure parameter value as a function of the first exposure parameter value, a constant,
device calibration data,
a target level of saturation of the image sensor,
a first black level,
the at least one measured percentile value for the target saturation level of the digital sensor values of at least one first light source group,
and a second black level,
wherein the device calibration data comprises the relationship between the digital sensor values and a sensor exposure parameter value for a reference object.

2. The method according to claim 1, comprising extracting percentile values in a range selected from 50 to 100, 70 to 100, 95 to 98 or any of 75, 85, 95, 98, 99, 99.5, 100% percentiles.

3. The method according to claim 2, wherein for each second light source group the constant is the 95-98 percentile level of saturation of a first light source group minus the first black level divided by the corresponding exposure parameter value of the first light source group, divided by a percentile value selected from a 95-98 percentile level of saturation or any of a 75, 85, 95, 98, 99, 99.5, 100% percentile value of the second light source group minus the second black level divided by the corresponding exposure parameter value for the second light source group.

4. The method according to claim 1, comprising estimating the exposure parameter value by using a multiple of percentile values.

5. The method according to claim 1, comprising including in the calibration data one or more of: sensor black offset, sensor optical sensitivity, sensor non-linearity, sensor non-uniformity, light source drive current, sensor exposure time, sensor analog gain, sensor digital gain, light source optical efficiency, light source non-uniformity or light source temperature.

6. The method according to claim 1, comprising estimating the exposure parameter value by using at least two first light source groups.

7. The method according to claim 1, comprising estimating the exposure parameter value by estimating any of: light source current, sensor exposure time, sensor analog gain, sensor digital gain, light source brightness, or optical aperture.

8. The method according to claim 1, wherein the image sensor has an off-set current and the levels of saturation are decreased with a value corresponding to the off-set current.

9. The method according to claim 1, wherein a predetermined level of saturation is the highest linear level of saturation of the image sensor.

10. A system for estimating an exposure parameter value for imaging an object with an imaging device comprising:
a plurality of solid state light sources arranged into at least a first light source group and at least a second light source group, the light source groups emitting light within wavelength bands wherein the total coverage of all wavelength bands of the first light source group is at least as wide or wider as any wavelength band of the second light source group,
an image sensor having digital sensor values adopting a level of saturation, an image processor receiving the digital sensor values and the system is configured to implement the steps of:

imaging the object with at least the first light source group with a first exposure parameter value, the image sensor capturing an image of the object, and mapping the image onto the digital sensor values, and the image processor estimating a second exposure parameter value for at least the second light source group from the digital sensor values, and extracting at least one measured percentile value of the digital sensor values for a target saturation level, and estimating the second exposure parameter value as a function of the first exposure parameter value, a constant, device calibration data, a target level of saturation of the image sensor, a first black level, the at least one measured percentile value for the target saturation level of the digital sensor values of at least the first light source group, and a second black level, wherein the device calibration data comprises the relationship between the digital sensor values and a sensor exposure parameter value for a reference object.

11. The system according to claim 10, adapted to estimate the exposure parameter value by using a multiple of percentile values.

12. The system according to claim 10, wherein the calibration data includes one or more of: sensor black offset, sensor optical sensitivity, sensor non-linearity, sensor non-uniformity, light source drive current, sensor exposure time, sensor analog gain, sensor digital gain, light source optical efficiency, light source non-uniformity or light source temperature.

13. The system according to claim 10, adapted to estimate the exposure parameter value by using at least two first light source groups.

14. The system according to claim 10, adapted to estimate the exposure parameter value by estimating any of: light source current, sensor exposure time, sensor analog gain, sensor digital gain, light source brightness, or optical aperture.

15. The system according to claim 10, wherein for each second light source group the constant is the 95-98 percentile level of saturation of a first light source group divided by the corresponding exposure parameter value of the first light source group minus the first black level divided by a percentile value selected from a 95-98 percentile level of saturation or any of a 75, 85, 95, 98, 99, 99.5, 100% percentile value of the second light source group minus the second black level divided by the corresponding exposure parameter value for the second light source group.

16. The system according to claim 10, wherein the image sensor has an off-set current and the levels of saturation are decreased with a value corresponding to the off-set current.

17. The system according to claim 10, wherein a predetermined level of saturation is the highest linear level of saturation of the image sensor.

18. A controller for estimating an exposure parameter value for imaging an object with an imaging device, said imaging device comprising:

a plurality of solid state light sources arranged into at least one first group and at least one second group, the first and second light source groups emitting light within wavelength bands wherein the total coverage of all wavelength bands of the first light source group is at least as wide or wider as any wavelength band of the second light source group, and an image sensor having digital sensor values adopting a level of saturation, the controller comprising: an image processor receiving the digital sensor values and being adapted to carry out the steps of:

imaging the object with the at least one first light source group with a first exposure parameter value, the image sensor capturing an image of the object, and mapping the image onto the digital sensor values, and the image processor estimating a second exposure parameter value for the at least one second light source group from the digital sensor values, and extracting at least one measured percentile value of the digital sensor values for a target saturation level, and estimating the second exposure parameter value as a function of the first exposure parameter value, a constant, device calibration data, a target level of saturation of the image sensor, a first black level, the at least one measured percentile value of the target saturation level of the digital sensor values of at least one first light source group, and a second black level, wherein the device calibration data comprises the relationship between the digital sensor values and a sensor exposure parameter value for a reference object.

19. The controller according to claim 18, for use with a reference target, wherein for each of the second light source groups the constant is selected from the 95-98 percentile values or any of a 75, 85, 95, 98, 99, 99.5, 100% percentile level of saturation of the first light source group minus the first black level divided by the corresponding exposure parameter value of the first light source group, divided by a percentile selected from the 95-98 percentile level of saturation or any of the 75, 85, 95, 98, 99, 99.5, 100% percentile value of the second light source group minus the second black level divided by the corresponding exposure parameter value for the second light source group.

20. A computer program product stored on a machine readable non-transient storage means, the program product comprising code which, when executed on a processing device, carries out a method of claim 1.

* * * * *